United States Patent
Tani et al.

(10) Patent No.: US 9,454,793 B2
(45) Date of Patent: Sep. 27, 2016

(54) DISPLAY CONTROL DEVICE AND MOBILE ELECTRONIC APPARATUS

(71) Applicant: Synaptics Display Devices GK, Tokyo (JP)

(72) Inventors: Kunihiko Tani, Tokyo (JP); Yoshikazu Yokota, Tokyo (JP); Goro Sakamaki, Tokyo (JP); Takashi Ohyama, Tokyo (JP); Shigeru Ohta, Tokyo (JP); Kei Tanabe, Tokyo (JP)

(73) Assignee: Synaptics Display Devices GK, Tokyo (JP)

( * ) Notice: Subject to any disclaimer, the term of this patent is extended or adjusted under 35 U.S.C. 154(b) by 0 days.

(21) Appl. No.: 14/024,579

(22) Filed: Sep. 11, 2013

(65) Prior Publication Data

US 2014/0043348 A1     Feb. 13, 2014

Related U.S. Application Data

(60) Continuation of application No. 12/343,902, filed on Dec. 24, 2008, now abandoned, which is a division of application No. 11/030,291, filed on Jan. 7, 2005, now abandoned, which is a continuation-in-part of (Continued)

(30) Foreign Application Priority Data

Dec. 18, 2000   (JP) .................................. 2000-383012
Dec. 27, 2001   (JP) .................................. 2001-397307

(51) Int. Cl.
*G09G 3/36*       (2006.01)
*G06T 1/60*       (2006.01)

(Continued)

(52) U.S. Cl.
CPC ............... *G06T 1/60* (2013.01); *G09G 3/3611* (2013.01); *G09G 5/393* (2013.01); *G09G 5/395* (2013.01); *G09G 3/3685* (2013.01); *G09G 5/12* (2013.01); *G09G 2310/027* (2013.01);

(Continued)

(58) Field of Classification Search
CPC ....................... G09G 3/3611; G09G 2310/027
USPC ........................................ 345/64–81, 98–100
See application file for complete search history.

(56) References Cited

U.S. PATENT DOCUMENTS

| | | |
|---|---|---|
| 4,874,164 A | 10/1989 | Miner et al. |
| 5,241,304 A | 8/1993 | Munetsugu et al. |

(Continued)

FOREIGN PATENT DOCUMENTS

| | | |
|---|---|---|
| EP | 319 661 | 6/1989 |
| JP | 9-320259 | 12/1997 |

(Continued)

*Primary Examiner* — Dennis Joseph
(74) *Attorney, Agent, or Firm* — Miles & Stockbridge P.C.

(57) ABSTRACT

A display control device and technique for controlling displays on a display unit, in which a plurality of display segments are two-dimensionally arranged (e.g. a dot matrix type display unit), is provided. The technique is effectively applicable to a write data latch circuit of a memory for storing display data in the display control device, such as, for example, a liquid crystal display control device, a mobile electronic apparatus, etc. A display drive control technique for controlling a moving picture display mode of a display device is also provided. The display drive control circuit controls a picture display mode of a display device for displaying still pictures and moving pictures to a liquid crystal display device, such as, for example, a dot matrix type display devices, an organic EL display device, etc.

11 Claims, 36 Drawing Sheets

Related U.S. Application Data application No. 09/998,325, filed on Dec. 3, 2001, now abandoned, and a continuation-in-part of application No. 10/323,831, filed on Dec. 20, 2002, now Pat. No. 7,176,870.

(51) Int. Cl.
*G09G 5/393* (2006.01)
*G09G 5/395* (2006.01)
*G09G 5/12* (2006.01)

(52) U.S. Cl.
CPC ............... *G09G 2310/0278* (2013.01); *G09G 2320/0247* (2013.01); *G09G 2320/0261* (2013.01); *G09G 2320/103* (2013.01); *G09G 2330/021* (2013.01); *G09G 2340/125* (2013.01); *G09G 2360/18* (2013.01)

(56) References Cited

U.S. PATENT DOCUMENTS

| | | |
|---|---|---|
| 5,604,511 A | 2/1997 | Ohi |
| 5,687,132 A | 11/1997 | Rao |
| 5,742,271 A | 4/1998 | Imamura et al. |
| 5,754,152 A | 5/1998 | Nakamura et al. |
| 5,844,856 A | 12/1998 | Taylor |
| 5,905,483 A | 5/1999 | Yuki |
| 5,905,489 A | 5/1999 | Takahama et al. |
| 6,005,537 A | 12/1999 | Yokota et al. |
| 6,147,667 A | 11/2000 | Yamazaki et al. |
| 6,229,513 B1 | 5/2001 | Nakano et al. |
| 6,262,723 B1 | 7/2001 | Matsuzawa et al. |
| 6,295,045 B1 | 9/2001 | Furuhashi et al. |
| 6,353,435 B2 | 3/2002 | Kudo et al. |
| 6,380,917 B2 * | 4/2002 | Matsueda et al. ............ 345/89 |
| 6,384,807 B1 | 5/2002 | Furuhashi et al. |
| 6,407,732 B1 | 6/2002 | Stiens et al. |
| 6,421,038 B1 | 7/2002 | Lee |
| 6,437,768 B1 | 8/2002 | Kubota et al. |
| 6,448,976 B1 | 9/2002 | Nitta et al. |
| 6,518,946 B2 * | 2/2003 | Ode et al. .................... 345/98 |
| 6,529,181 B2 | 3/2003 | Nakano et al. |
| 6,559,824 B1 | 5/2003 | Kubota et al. |
| 6,597,337 B1 | 7/2003 | Kumagawa et al. |
| 6,618,043 B2 | 9/2003 | Washio et al. |
| 6,734,877 B1 | 5/2004 | Kondo et al. |
| 6,784,897 B2 | 8/2004 | I |
| 7,434,245 B1 | 10/2008 | Shiga et al. |
| 2001/0012061 A1 * | 8/2001 | Hayashi ..................... 348/222 |
| 2002/0075272 A1 | 6/2002 | Tani et al. |
| 2002/0105506 A1 | 8/2002 | Hiyama et al. |
| 2003/0038884 A1 | 2/2003 | Matsushita et al. |
| 2003/0218682 A1 | 11/2003 | Lim et al. |
| 2004/0202456 A1 | 10/2004 | Sasagawa |

FOREIGN PATENT DOCUMENTS

| | | |
|---|---|---|
| JP | 10-282938 | 10/1998 |
| JP | 2002-182627 | 6/2002 |
| JP | 2006-053574 | 2/2006 |
| WO | WO 9100587 | 1/1991 |

\* cited by examiner

FIG. 6A

UNIT OF BURST WRITE

| | | | | | | | | | |
|---|---|---|---|---|---|---|---|---|---|
| 1 LINE | $0000 | $0001 | $0002 | $0003 | $0004 | $0005 | $0006 | $0007 | ... | $003F |
| 2 LINE | $0100 | $0101 | $0102 | $0103 | $0104 | $0105 | $0106 | $0107 | ... | $013F |
| 3 LINE | $0200 | $0201 | $0202 | $0203 | $0204 | $0205 | $0206 | $0207 | ... | $023F |
| 128 LINE | $7F00 | $7F01 | $7F02 | $7F03 | $7F04 | $7F05 | $7F06 | $7F07 | ... | $7F3F |
| 168 LINE | $A700 | $A701 | $A702 | $A703 | $A704 | $A705 | $A706 | $A707 | ... | $A73F |
| 256 LINE | $FF00 | $FF01 | $FF02 | $FF03 | $FF04 | $FF05 | $FF06 | $FF07 | ... | $FF3F |

FIG. 6B

DUMMY DATA — WRITE DATA — DUMMY DATA

| | | | | | | | | | |
|---|---|---|---|---|---|---|---|---|---|
| 1 LINE | $0000 | $0001 | $0002 | $0003 | $0004 | $0005 | $0006 | $0007 | ... | $003F |
| 2 LINE | $0100 | $0101 | $0102 | $0103 | $0104 | $0105 | $0106 | $0107 | ... | $013F |
| 3 LINE | $0200 | $0201 | $0202 | $0203 | $0204 | $0205 | $0206 | $0207 | ... | $023F |
| 128 LINE | $7F00 | $7F01 | $7F02 | $7F03 | $7F04 | $7F05 | $7F06 | $7F07 | ... | $7F3F |
| 168 LINE | $A700 | $A701 | $A702 | $A703 | $A704 | $A705 | $A706 | $A707 | ... | $A73F |
| 256 LINE | $FF00 | $FF01 | $FF02 | $FF03 | $FF04 | $FF05 | $FF06 | $FF07 | ... | $FF3F |

FIG. 7A i) REWRITE AREA: IN NEW 4 WORDS WRITING, A WRITE ADDRESS BEGINS FROM THE MULTIPLE OF 4.

| $0000 | $0001 | $0002 | $0003 | $0004 | $0005 | $0006 | $0007 |
|---|---|---|---|---|---|---|---|
| $0100 | $0101 | $0102 | $0103 | $0104 | $0105 | $0106 | $0107 |
| $0200 | $0201 | $0202 | $0203 | $0204 | $0205 | $0206 | $0207 |

NUMBER OF TIMES FOR WRITING TO LATCHES: 4 TIMES

| (1) | (2) | (3) | (4) |  |
|---|---|---|---|---|
|  |  |  |  |  |
|  |  |  |  |  |

RAM: ONCE

FIG. 7B ii) REWRITE AREA: IN NEW 8 WORDS WRITING, A WRITE ADDRESS BEGINS FROM THE MULTIPLE OF 4.

| $0000 | $0001 | $0002 | $0003 | $0004 | $0005 | $0006 | $0007 |
|---|---|---|---|---|---|---|---|
| $0100 | $0101 | $0102 | $0103 | $0104 | $0105 | $0106 | $0107 |
| $0200 | $0201 | $0202 | $0203 | $0204 | $0205 | $0206 | $0207 |

NUMBER OF TIMES FOR WRITING TO LATCHES: 8 TIMES

| (1) | (2) | (3) | (4) |
|---|---|---|---|
| (5) | (6) | (7) | (8) |
|  |  |  |  |

RAM: TWICE

FIG. 7C iii) REWRITE AREA: WHEN IT WRITES IN A DIFFERENT LINE EVERY 4 WORDS, EACH WRITE ADDRESS BEGINS FROM THE MULTIPLE OF 4.

| $0000 | $0001 | $0002 | $0003 | $0004 | $0005 | $0006 | $0007 |
|---|---|---|---|---|---|---|---|
| $0100 | $0101 | $0102 | $0103 | $0104 | $0105 | $0106 | $0107 |
| $0200 | $0201 | $0202 | $0203 | $0204 | $0205 | $0206 | $0207 |

NUMBER OF TIMES FOR WRITING TO LATCHES: 8 TIMES

| (1) | (2) | (3) | (4) |
|---|---|---|---|
| (5) | (6) | (7) | (8) |
|  |  |  |  |

RAM: TWICE

FIG. 8A i) REWRITE AREA: IN NEW 3 WORDS WRITING, A WRITE ADDRESS DOES NOT BEGIN FROM THE MULTIPLE OF 4.

| $0000 | $0001 | $0002 | $0003 | $0004 | $0005 | $0006 | $0007 |
|---|---|---|---|---|---|---|---|
| $0100 | $0101 | $0102 | $0103 | $0104 | $0105 | $0106 | $0107 |
| $0200 | $0201 | $0202 | $0203 | $0204 | $0205 | $0206 | $0207 |

NUMBER OF TIMES FOR WRITING TO LATCHES: 4 TIMES (1) (2) (3) (4)

RAM: ONCE

FIG. 8B ii) REWRITE AREA: IN NEW 4 WORDS WRITING, A WRITE ADDRESS DOES NOT BEGIN FROM THE MULTIPLE OF 4.

| $0000 | $0001 | $0002 | $0003 | $0004 | $0005 | $0006 | $0007 |
|---|---|---|---|---|---|---|---|
| $0100 | $0101 | $0102 | $0103 | $0104 | $0105 | $0106 | $0107 |
| $0200 | $0201 | $0202 | $0203 | $0204 | $0205 | $0206 | $0207 |

NUMBER OF TIMES FOR WRITING TO LATCHES: 8 TIMES (1) (2) (3) (4) (5) (6) (7) (8)

RAM: TWICE

FIG. 8C iii) REWRITE AREA: WHEN IT WRITES IN A DIFFERENT LINE EVERY 6 WORDS, EACH WRITE ADDRESS DOES NOT BEGIN FROM THE MULTIPLE OF 4.

| $0000 | $0001 | $0002 | $0003 | $0004 | $0005 | $0006 | $0007 |
|---|---|---|---|---|---|---|---|
| $0100 | $0101 | $0102 | $0103 | $0104 | $0105 | $0106 | $0107 |
| $0200 | $0201 | $0202 | $0203 | $0204 | $0205 | $0206 | $0207 |

NUMBER OF TIMES FOR WRITING TO LATCHES: 16 TIMES (1) (2) (3) (4) (5) (6) (7) (8)
(9) (10) (11) (12) (13) (14) (15) (16)

RAM: 4 TIMES

FIG. 9A

| WRITE START ADDRESS | MASK AMOUNT FOR START SIDE | WRITE END ADDRESS | MASK AMOUNT FOR END SIDE |
|---|---|---|---|
| WSA | SMW | WEA | EMW |

FIG. 9B

| | 0000 | 0001 | 0002 | 0003 | 0004 | 0005 | 0006 | 0007 | 0008 | 0009 | 000A | 000B |
|---|---|---|---|---|---|---|---|---|---|---|---|---|
| CASE 1 | □ | □ | □ | □ | □ | □ | □ | □ | □ | □ | □ | □ |
| CASE 2 | ■ | □ | □ | □ | □ | □ | □ | □ | □ | □ | □ | ■ |
| CASE 3 | ■ | ■ | □ | □ | □ | □ | □ | □ | □ | □ | ■ | ■ |
| CASE 4 | ■ | ■ | ■ | □ | □ | □ | □ | □ | □ | ■ | ■ | ■ |

■ = MASK PORTION

FIG. 9C

| | WSA | SMW | WEA | EMW |
|---|---|---|---|---|
| CASE 1 | 0000 | 00 | 000B | 00 |
| CASE 2 | 0001 | 01 | 000A | 01 |
| CASE 3 | 0010 | 10 | 0009 | 10 |
| CASE 4 | 0011 | 11 | 0008 | 11 |

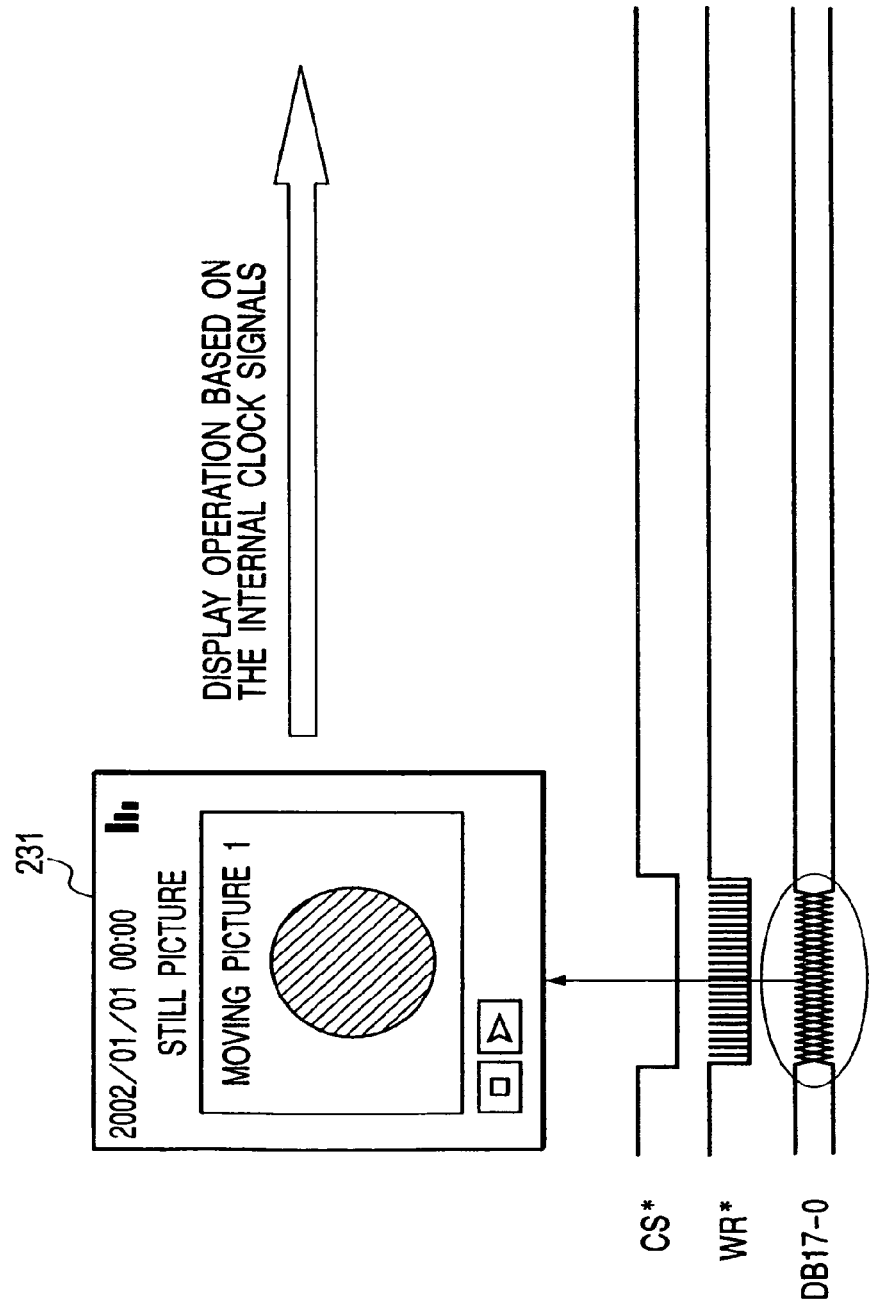

FIG. 21

| | MERIT | DEMERIT |
|---|---|---|
| ① FIG. 19<br>SYSTEM INTERFACE ONLY (DISPLAY MEMORY EXISTS) | STILL PICTURE : SMALL AMOUNTS OF DATA TRANSMISSION<br>LOW POWER CONSUMPTION<br>MOVING PICTURE : SMALL AMOUNTS OF DATA TRANSMISSION<br>LOW POWER CONSUMPTION | MOVING PICTURE : FLICKER OCCURS WHEN UPDATING OR CHANGING THE SCREEN |
| ② FIG. 17<br>MOVING PICTURE INTERFACE ONLY (LINE MEMORY ONLY) | MOVING PICTURE : NO FLICKER OCCURS WHEN UPDATING OR CHANGING THE SCREEN | STILL PICTURE : LARGE AMOUNTS OF DATA TRANSMISSION<br>HIGH POWER CONSUMPTION<br>MOVING PICTURE : LARGE AMOUNTS OF DATA TRANSMISSION<br>HIGH POWER CONSUMPTION |
| ③ INVENTION | STILL PICTURE : SMALL AMOUNTS OF DATA TRANSMISSION<br>LOW POWER CONSUMPTION<br>MOVING PICTURE : NO FLICKER OCCURS WHEN UPDATING OR CHANGING THE SCREEN<br>SMALL AMOUNTS OF DATA TRANSMISSION<br>LOW POWER CONSUMPTION | — |

VSYNC : VERTICAL SYNCHRONIZATION SIGNAL
HSYNC : HORIZONTAL SYNCHRONIZATION SIGNAL
DOTCLK : DOT CLOCK
ENABLE : DATA ENABLE SIGNAL
PD17-0 : RGB (6:6:6) DISPLAY DATA

VSYNC: VERTICAL SYNCHRONIZATION SIGNAL
HSYNC: HORIZONTAL SYNCHRONIZATION SIGNAL
DOTCLK: DOT CLOCK
ENABLE: DATA ENABLE SIGNAL
PD17-0: RGB (6:6:6) DISPLAY DATA

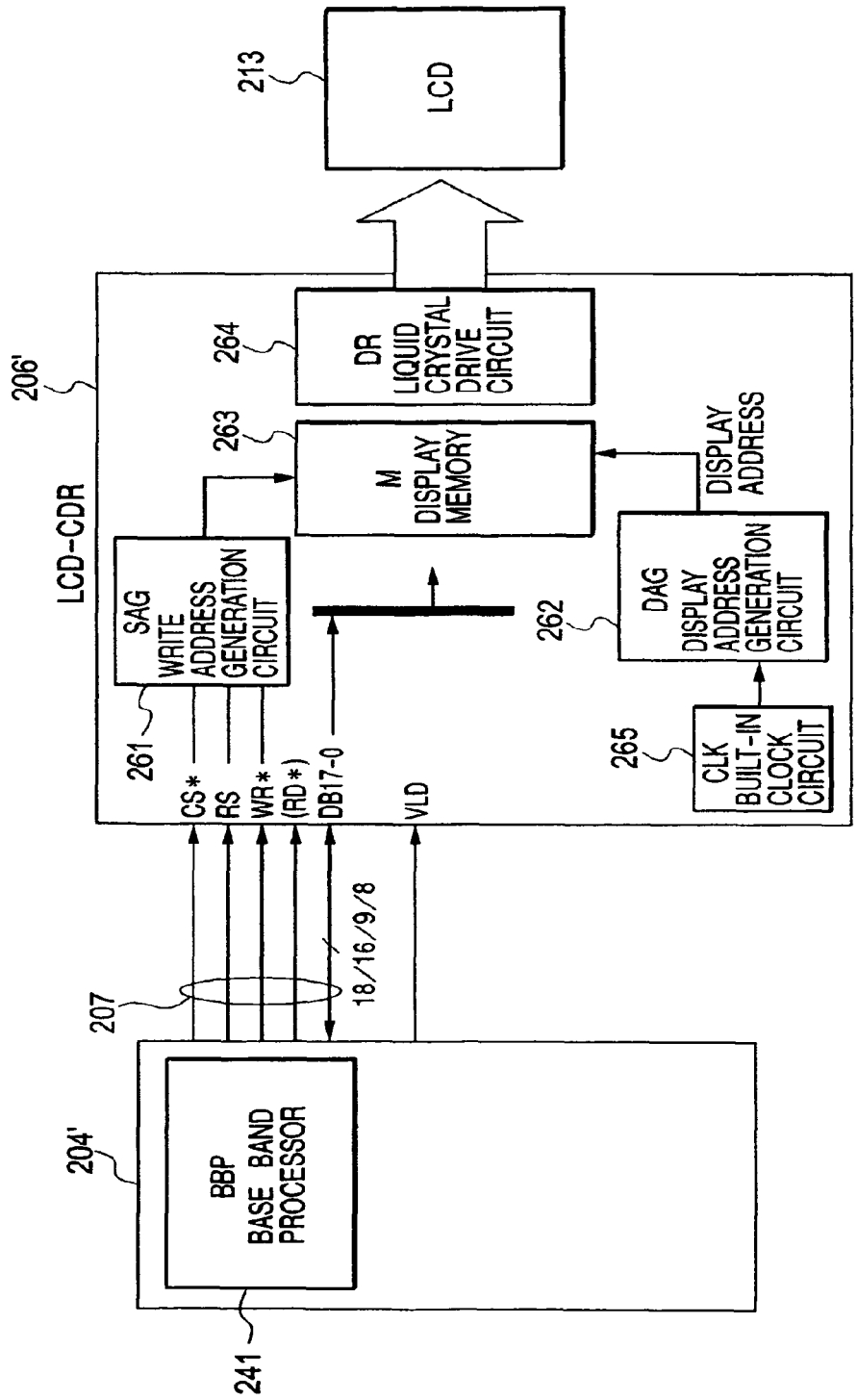

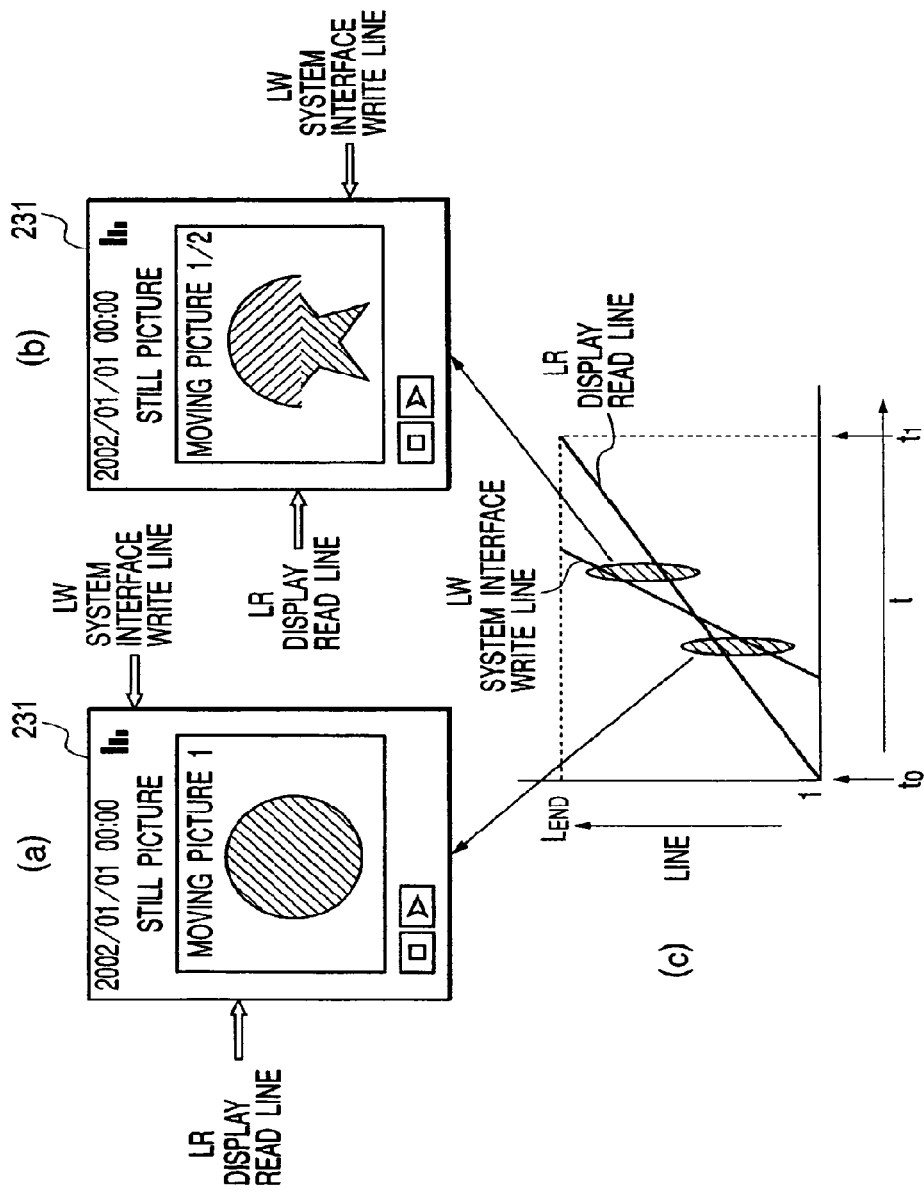

DISPLAY CONTROL DEVICE AND MOBILE ELECTRONIC APPARATUS

CROSS-REFERENCE TO RELATED APPLICATIONS

This application is a continuation of U.S. patent application Ser. No. 12/343,902 (filed Dec. 24, 2008), which is a division of U.S. patent application Ser. No. 11/030,291 (filed Jan. 7, 2005), now abandoned, which is a continuation-in-part of U.S. patent application Ser. No. 09/998,325 (filed Dec. 3, 2001), now abandoned, and U.S. patent application Ser. No. 10/323,831 (filed Dec. 20, 2002), now U.S. Pat. No. 7,176,870, each of which is incorporated herein by reference in its entirety.

BACKGROUND OF THE INVENTION

A dot matrix type liquid crystal panel, in which a plurality of display picture elements are two-dimensionally arranged in a matrix form, for instance, is usually employed as a display device for a mobile electronic apparatus, such as a mobile telephone or a pager. In such an apparatus, a display control device, configured as a semiconductor integrated circuit, a driver for the liquid crystal panel or a display control device with a built-in driver is mounted for controlling displays on this liquid crystal panel. Some of these display control devices may have a rewritable random access memory (RAM) built in for storing data to be displayed on the liquid crystal panel. Upon receiving display data from a microprocessor controlling the whole apparatus or processing transmit/receive signals, the display control device rewrites display data in the internal RAM (hereinafter to be referred to as the display RAM).

More specifically, as shown in FIG. 11, data such as 1 word (16 bits), supplied from the microprocessor via buses BUS0 through BUS15 are successively taken into latch circuit groups LTG1 through LTG4, provided to match bit lines of the display RAM 140, in synchronism with timing signals $\phi11$, $\phi12$ . . . shown in FIG. 12. Transfer gate groups TGT1 through TGT4, provided between the latch circuit groups LTG1 through LTG4 and the display RAM, are successively opened in accordance timing signals $\phi31$, $\phi32$ . . . , and data are successively written into the display RAM 140 word by word. This has been the usual way of processing.

The demand for the display of moving pictures on a display screen of a mobile telephone has been increasing in recent years. As a display device of this type, a liquid crystal display device, an organic EL display device, a plasma display device or a field emission type display device, etc., are known. However, since the existing mobile telephone has been mainly used to display still pictures including a text, a drive control circuit thereof is only provided with a still-picture-text-system-I/O-interface and does not comprise an interface corresponding to moving pictures. Accordingly, the existing drive control circuit is capable of displaying moving pictures but it is difficult for such circuit to display moving pictures in higher picture quality which can be seen smoothly.

FIG. 33 is a block diagram for explaining an example of a drive circuit system configuration of a mobile telephone having no interface corresponding to moving pictures which is an example of a display drive control circuit and display device. This display drive control circuit system 201' is configured with an audio interface (AUI) 202, a high frequency interface (HFI) 203, a picture processor 204', a liquid crystal controller driver-driver (LCD-CDR) 206' as a memory 205 and a display drive control circuit and a still-picture-text-system-I/O bus-interface (SS/IF) 207, etc. Reference numeral 209 designates a microphone (M/C); 210, a speaker (S/P); 212, an antenna (ANT); 213, a liquid crystal panel (liquid crystal display; LCD).

The picture processor 204' is configured with a baseband processor 241 including a digital signal processor (DSP) 411, an ASIC 412 and a microcomputer MPU. The audio interface (AUI) 202 controls prefetch of an audio input from the microphone 209 and output of an audio signal to the speaker 10.

For the display to the liquid crystal panel 213, picture data is read from the memory 205 and is subject to the necessary processes in the microcomputer MPU 413. Thereafter, the picture data is then written into the display RAM within the liquid crystal controller driver (LCD-CDR) 206'. In the moving picture display mode, 10 to 15 frames are changed within a second. In this system, a system I/O bus represented by the 80-system interface is used. The still-picture-text-system-I/O bus-interface (SS/IF) 207 is referred to as system interface 207 in a certain case.

Display operation in the liquid crystal controller driver (LCD-CDR) 206' is realized with a built-in clock thereof. Therefore, write operation of picture data and display operation thereof are performed asynchronously.

SUMMARY OF THE INVENTION

In one of its principal aspects, the present invention relates to a display control device for controlling displays on a display unit in which a plurality of display segments are two-dimensionally arranged (e.g. a dot matrix type display unit) and, further, to a technique effectively applicable to a write data latch circuit of a memory for storing display data in the display control device, for instance a technique effectively applicable to a liquid crystal display control device and a mobile electronic apparatus therewith.

Previously, many of the liquid crystal panels used in such mobile electronic apparatuses were for monochromic displaying. However, along with the increasing functional sophistication of mobile electronic apparatuses in recent years, contents to be displayed on the display unit are increasing in diversity, with color displays or animated displays beginning to be available.

Since color displays or animated displays involve far greater quantities of display data than monochromic still picture displays, the microprocessor needs a high operating frequency, and the display RAM is also required to perform high speed write operations.

However, among mobile electronic apparatuses, since mobile telephones in particular need battery saving, the display control device and other LSIs (large scale integrated circuits) to be mounted on them are required to be reduced in power consumption. Yet, as the display RAM built into a conventional display control device uses a system in which data are sequentially written word by word as shown in FIG. 12, a problem has been found that, if the write speed is to be raised to match the transfer speed of display data from the microprocessor, the power consumption will increase in proportion to the transfer speed.

An object of the present invention, attempted in view of the problem noted above, is to provide a display control device capable of writing data into an internal display RAM at high speed without increasing power consumption and a mobile electronic apparatus mounted therewith.

The above-stated and other objects and novel features of the invention will become apparent from the description in this specification and the accompanying drawings.

In one of its preferred modes, the present invention provides a display control device having a display memory which is capable of storing display data for a display device and into which display data are written in a prescribed number of bits at a time. The display control device successively reads display data out of the display memory and forms and supplies a drive signal to the display device. The display memory has a memory array provided with a plurality of memory cells arranged in an array, a plurality of word lines to which selection terminals for the memory cells of the same row are connected, and a plurality of bit lines which are arranged in a direction to cross the word lines and to which data input/output nodes for memory cells of the same column are connected. Input transfer means and output transfer means are connected to the bit lines, and data transfer by the input transfer means results in writing of data into memory cells connected to a word line in a selected state, whereas data transfer by the output transfer means results in reading of data out of memory cells connected to a word line in a selected state. The display control device is further provided with a plurality of first data latch means capable of successively taking in display data in the prescribed number of bits at a time. Display data held by the first data latch means can be collectively transferred by the input transfer means to the bit lines of the display memory in a number of bits at a time equal to an integral multiple of (n times) the number of bits of the display data taken into the first data latch means.

In the device described above, the display memory has a configuration without a sense amplifier. Data to be written into the display memory are transferred by the input transfer means from the latch circuit directly to a bit line and, when data are to be read, data on a bit line are supplied by the output transfer means and a plurality of data are collectively written into the display memory are being once latched by the latch circuit. This can save as much power as a sense amplifier would otherwise consume. The power consumption by the memory can also be reduced as compared with a system in which data are written one by one into the display memory, because the frequency of accessing the display memory (the frequency of actuating word lines) is reduced. Dispensing with a sense amplifier, even though it may slow down writing or reading, results in faster overall data writing than the conventional system of writing data one by one, because a plurality of data can be written into the display memory collectively.

Preferably, the display control device may be further provided with a plurality of second data latch means. The second data latch means are capable of taking in display data held by the first data latch means in a number of bits at a time equal to an integral multiple of the number of bits of the display data taken into the first data latch means. Further, the input transfer means are configured to be capable of transferring display data held by the second data latch means to the bit lines of the display memory in a number of bits at a time equal to an integral multiple of (n times) the number of bits of the display data taken into the first data latch means. The display data to be written next are taken in by the first data latch means, while the data to be written into the display memory are transferred from the second data latch means to the display memory. Thus, data can be written at high speed even when writing of data into memory cells connected to the same bit line is to take place consecutively.

Also preferably, transferring of data by the input transfer means to the bit lines of the display memory may take place at the same timing as the final data are taken into the first data latch means. Thus, even when data to be written into the display memory are to be transferred in a number of bits at a time equal to an integral multiple of the prescribed number of bits, the data can be transferred one cycle earlier than where they are transferred to the display memory collectively in the next cycle after the final data are taken into the first data latch means.

Also, the number of the first data latch means is an integral multiple of n times. Thus, where data are to be written consecutively onto one row of the display memory, the data can be transferred without generating any fraction and the total time length of data writing to be shortened.

Further, the display control device may be further provided with a mask setting means capable of setting the number of bits of data to be transferred by the input transfer means to the bit lines of the display memory, with the input transfer means being controlled on the basis of the set information of the mask setting means. This enables, even where data are to be rewritten by collective writing from any position in the display memory, data not required to be rewritten to be prevented from being rewritten by mistake. Also, where data are to be written from midway in a plurality of collectively rewritable data, the use of the mask setting means makes possible collective writing and a reduction of the time length required for writing.

The mask setting means may be configured to be able to set the start address of write data in a range of consecutive addresses and the quantity of data to be masked from that start address and the end address of the same and the quantity of data to be masked from that end address. This makes possible masked writing of data of any length with the mask setting means.

Further, the display control device may be provided with a segment drive means for generating signals for driving segment electrodes of an external liquid crystal display device on the basis of display data read out of the display memory, the means being configured as a semiconductor integrated circuit over a single semiconductor chip. This makes it possible, where a system using a liquid crystal display device is to be configured, the number of components constituting the system, and accordingly the mounting area, can be reduced because the segment drive means is built into the display control device.

A mobile electronic apparatus pertaining to the present invention is provided with a display control device having any of the configurations described above, a data processing unit for generating display data to be written into the display memory and setting information on their writing position, and a display device for carrying out displaying with a display drive signal read out of the display memory and formed by the display control device on the basis of the display data. This serves to reduce the consumption of the battery, which is the power source of the mobile electronic apparatus, and to realize a mobile electronic apparatus capable of operating for a long period per charge.

In the mobile electronic apparatus, the display device may be a dot matrix type liquid crystal display device. This serves to further reduce the consumption of the battery and to extend the duration of operation.

In the mobile electronic apparatus, the display control device may be provided with a segment drive means for generating signals for driving segment electrodes of the liquid crystal display device, and a common electrode drive circuit for generating a signal for driving common electrodes of the liquid crystal display device is configured as a semiconductor integrated circuit over a separate semiconductor chip from the semiconductor chip over which the display control device is formed, wherein the common electrode drive circuit is configured of an element higher in withstand voltage than the elements constituting the display control device. This enables only the common electrode drive circuit requiring a high withstand voltage to be configured on another chip, making it possible to enhance the performance compared with a configuration in which segment drive means and the common electrode drive circuit are formed over the same chip, to simplify the process and to reduce the manufacturing cost.

In another of its principal aspects, the present invention relates to a display drive control technique for controlling a picture display mode of a display device and, more particularly, to a display drive control circuit for controlling a picture display mode of a display device for displaying still pictures and moving pictures to a liquid crystal display device, an organic EL display device or other dot matrix type display devices.

FIG. 34 illustrates schematic diagrams for explaining an example of a display screen change operation during moving picture display in the system illustrated in FIG. 33. A profile of displaying moving pictures within the display area of the still picture is illustrated in the display screen 231 of the mobile telephone of FIG. 34. The display profile of this figure is also applied to the subsequent figures. Write operation of picture data to the display RAM in the liquid crystal controller driver (LCD-CDR) 206' is executed without relation to the display operation. Since the write operation of picture data and read operation of the relevant data for display on the liquid crystal panel LCD are performed without any relation (asynchronously), change of display screen to the moving picture 2 of FIG. 34(c) from the moving picture 1 of FIG. 34(a) is performed in some cases from the halfway of display of the relevant picture as illustrated in FIG. 34(b).

In the case where a picture is changed in the course of display thereof, change of display is performed while a moving picture 1 and a moving picture 2 exist simultaneously in the same display. Therefore, interface between the moving picture 1 and moving picture 2 becomes distinctive as illustrated in FIG. 34(b) and this interface is visualized as flicker of display in some cases. Therefore, such interface is not preferable from the viewpoint of display quality. As described previously, it is difficult to realize high quality display only with the still-picture-text-system-I/O bus-interface SS/IF. For the display of moving pictures, it is necessary to write the picture data synchronously with the display operation.

FIG. 35 is a block diagram for describing an example of configuration of the liquid crystal controller driver and peripheral circuits thereof in the system illustrated in FIG. 33. The liquid crystal controller driver (LCD-CDR) 206' is composed of a write address generation circuit 261, a display address generation circuit 262, a display memory (M) 263 as a bit map picture memory formed of RAM, a liquid crystal drive circuit (DR) 264 and a built-in clock generation circuit (CLK) 65. The display data (DB17-0) from the baseband processor 241 of the picture processor 204' is written into the built-in display memory M from the system interface (SS/IF) 207.

In this case, a write address is generated in the write address generation circuit (SAG) 261 with each signal of system interface signal CS (chip select) and signal RS (resister select) and signal WR (write). The display data in the display operation is read from the display memory (M) 263 depending on the display address generated by the display address generation circuit (DAG). This display address is generated in synchronization with the clock generated by the built-in clock generation circuit (CLK) 265. Operation by this built-in clock and operation by the system interface (SS/IF) are performed without any relation (asynchronously).

FIG. 36 is a schematic diagram for describing a profile of change of display of moving picture on the display screen of a mobile telephone utilizing the liquid crystal controller driver of the system illustrated in FIG. 35. A display read line by the display operation (scanning line: pixel selection line) LR is read sequentially from the beginning at a constant rate depending on the built-in clock. Write operation to the memory M of display data from the system interface (SS/IF) 207 is performed without any relation from the display operation. Therefore, the write line LW by the system interface (SS/IF) 207 sometimes goes ahead of the display read line LR by the display operation. Namely, the display write line LW and display read line LR sometimes cross with each other.

When the write line and read line cross with each other as illustrated in FIG. 36(c), flicker is generated in the display at these crossing lines when the moving picture display condition of (a) changes to that of (b). In the display of 60 frames per second, when the 15 frames of moving picture are displayed per second, change of display is required once for every four frames. In this case, four changes of display occur in every second and flickers can be observed for times in every second. Such flickers of display has yet been left as a problem to be solved in the display device of this type.

When a configuration to eliminate such flicker of display described above is additionally provided to the liquid crystal controller driver, power consumption of a display device increases and this large power consumption is not preferable particularly for a mobile terminals such as a mobile telephone. It is therefore an object of the present invention to provide a display drive control system which has realized low power consumption by controlling power consumption of the additionally provided moving picture display function which has eliminated flicker of display and ensures high display quality during display of moving pictures.

Embodiments of the present invention introduce, in order to attain the object described above, an interface corresponding to moving pictures which is referred to as a first function in addition to a system interface in the still picture mode which is referred to as a second function and is characterized in realization of low power consumption by changing to a still picture interface (system interface) for operation of interface corresponding to moving pictures only during the required period. A configuration of the display drive control circuit of the present invention can be summarized as follows.

(1) A still-picture-text-system-I/O bus-interface, an external display interface for inputting moving picture data from a moving picture data processor, a picture display memory having a picture data storing area of at least one frame, and a display drive circuit for supplying display data to a display device are provided.

(2) A display operating changing register for selectively connecting display data of the still-picture-text-system-I/O bus-interface and external display interface for write and read operations and a memory access changing register are also provided in the item (1).

(3) In the item (1), a vertical synchronization signal input terminal of moving picture is also provided to control the write and read timings of moving picture display data to the picture display memory with a vertical synchronization signal inputted from the vertical synchronization signal input terminal.

(4) In the items (1) to (3), an enable signal input terminal is also provided for designating an area for displaying moving pictures to the display screen of the display device.

(5) In the items (1) to (3), an enable signal input terminal is also provided for designating an area for updating a part of the still picture in the area for displaying moving picture of the display screen of the display device.

(6) A first port to which moving picture data is transferred and a second port to which still picture data is transferred are provided.

(7) A memory for storing moving picture data to be supplied to the display panel, a first port to which moving picture data is transferred as the picture data stored in the memory, and a second port to which still picture data is transferred as the picture data stored in the memory are provided.

(8) The memory for storing picture data to be supplied to the display screen of the display panel, the first port to which moving picture data is transferred as the picture data stored in the memory and the external signal terminal to which a signal indicating the beginning of display picture is supplied are provided and transfer of the moving picture data is started in synchronization with the signal supplied to the external terminal.

(9) In the item (8), the second port to which the still picture data is transferred as the picture data stored in the memory is further provided.

(10) The memory for storing picture data to be supplied to the display screen of the display panel, the port to which the moving picture data is transferred as the picture data stored in the memory and the external terminal for receiving a signal to write the moving picture data to the predetermined area of the memory are provided.

(11) The memory for storing picture data to be supplied to the display panel, the first port to which the moving picture data is transferred as the picture data stored in the memory, the second port to which the still picture data is transferred as the picture data stored in the memory and a first control register for designating any one of the moving picture data supplied to the first port and the still picture data supplied to the second port at the time of writing the picture data to the memory are provided.

(12) A clock generation circuit for generating an internal operation clock, the memory for storing the picture data to be supplied to the display panel, the first port to which the moving picture data is transferred, as the picture data stored in the memory, in synchronization with a synchronization signal, the second port to which the still picture data is transferred as the picture data stored in the memory, and the first control register for controlling read operation of picture data transferred from the memory are provided; the still picture data supplied to the second port can be written into the memory in synchronization with the internal operation clock; and the first control register designates any one of the read operation synchronized with the synchronization signal and read operation synchronized with the internal clock signal at the time of reading the picture data from the memory.

According to the display drive control circuit of the present invention configured as described above, moving pictures may be displayed in higher picture quality and low power consumption can also be realized by changing the moving picture interface and still picture interface depending on contents of display (moving picture mode/still picture mode).

BRIEF DESCRIPTION OF THE DRAWINGS

FIGS. 6A and 6B are diagrams showing the relationships between each word (16-bit data) and the address in writing data into the display RAM in the collective writing mode in a system using the liquid crystal control driver embodying the invention.

FIGS. 7A to 7C are diagrams showing the relationships between the data size, the number of times of writing into the latch circuit, and the number of times of writing into the display RAM when data with neat breaks are to be written into the display RAM in the collective writing mode in the system using the liquid crystal control driver embodying the invention.

FIGS. 8A to 8C are diagrams showing the relationships between the data size, the number of times of writing into the latch circuit, and the number of times of writing into the display RAM when data with awkward breaks are to be written into the display RAM in the collective writing mode in the system using the liquid crystal control driver embodying the invention.

FIGS. 9A to 9C are diagrams showing an example of configuration of a mask register for setting the number of bits of data to be transferred to the bit lines of the display RAM, the relationship between the setpoint of the register, and examples of setpoints in the register.

FIG. 20 is a schematic diagram for describing a profile of still picture display by the liquid crystal controller driver of FIG. 19.

FIG. 21 is a diagram for describing merit and demerit of the configuration of the present invention through comparison of the configurations of FIG. 19 and FIG. 17.

FIG. 35 is a block diagram for describing a configuration example of the liquid crystal controller driver and peripheral circuits thereof in the system configuration of FIG. 33.

FIG. 36 is a schematic diagram for describing a profile of change of display of moving picture on the display screen of a mobile telephone utilizing the liquid crystal controller driver in the system configuration of FIG. 35.

DETAILED DESCRIPTION

Figure 1A:
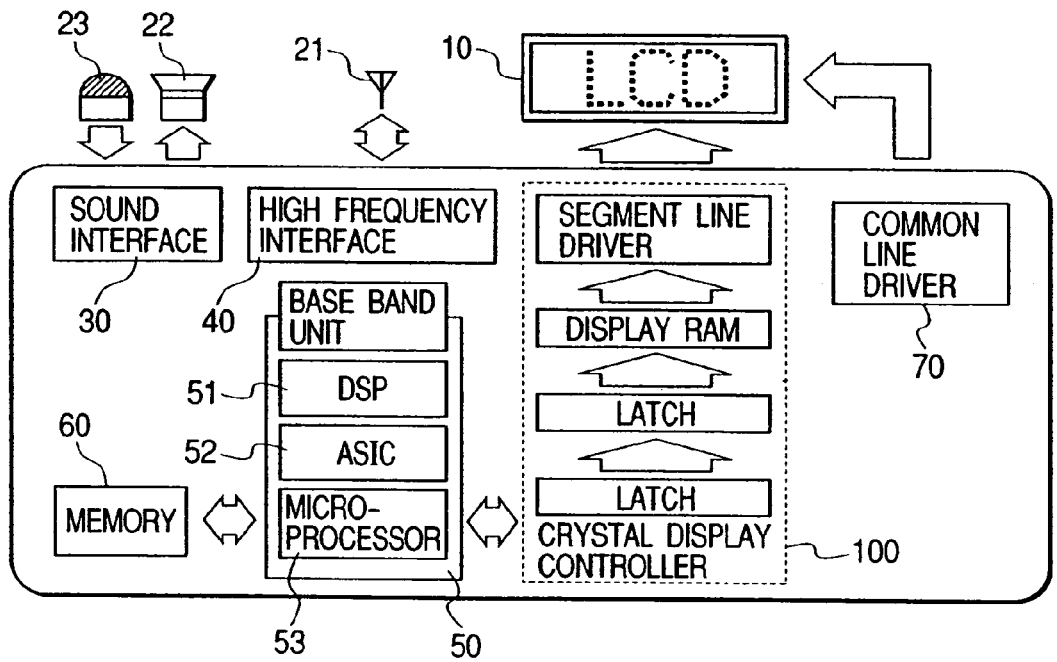
FIGS. 1A and 1B are block diagrams illustrating the overall configuration of a mobile telephone provided with a liquid crystal control driver to which the present invention is applied.

FIG. 1(A) is a block diagram illustrating the overall configuration of a mobile telephone provided with a liquid crystal control driver, which is a first preferred embodiment of a display control device according to the invention.

The mobile telephone using this embodiment of the invention is provided with a liquid crystal panel 10 as the display unit, an antenna 21 for use in transmission and reception, a loudspeaker 22 for sound outputting, a microphone 23 for sound inputting, a liquid crystal control driver 100 as the display control device pertaining to the invention, a sound interface 30 for inputting and outputting signals to and out of the microphone 23 and the loudspeaker 22, respectively, a high frequency interface 40 for inputting and outputting signals to and from the antenna 21, a digital signal processor (DSP) 51 for processing sound signals and transmit/receive signals, an application specific integrated circuit (ASIC) 52 for providing customized functions (user logic), a microprocessor 53 as the data processing unit for overall control, including display control, of the apparatus, and a memory 60 for storing data. The DSP 51, ASIC 52 and the microprocessor 53 constitute a so-called baseband unit 50.

The liquid crystal panel 10 may be, though not particularly limited to, a dot matrix type panel in which display picture elements, for instance 176×128, are arranged in a matrix. Where the liquid crystal panel is for color displaying, each picture element consists of three dots, that is, red, blue, and green. The memory 60, consisting of for instance a flash memory or the like permitting deletion block by block, the block having a prescribed size, stores a control program and control data for the whole mobile telephone system including display control, and also has the function of a character generator read only memory (CGROM), which is a pattern memory storing display data including character fonts as two-dimensional display patterns.

Figure 1B:
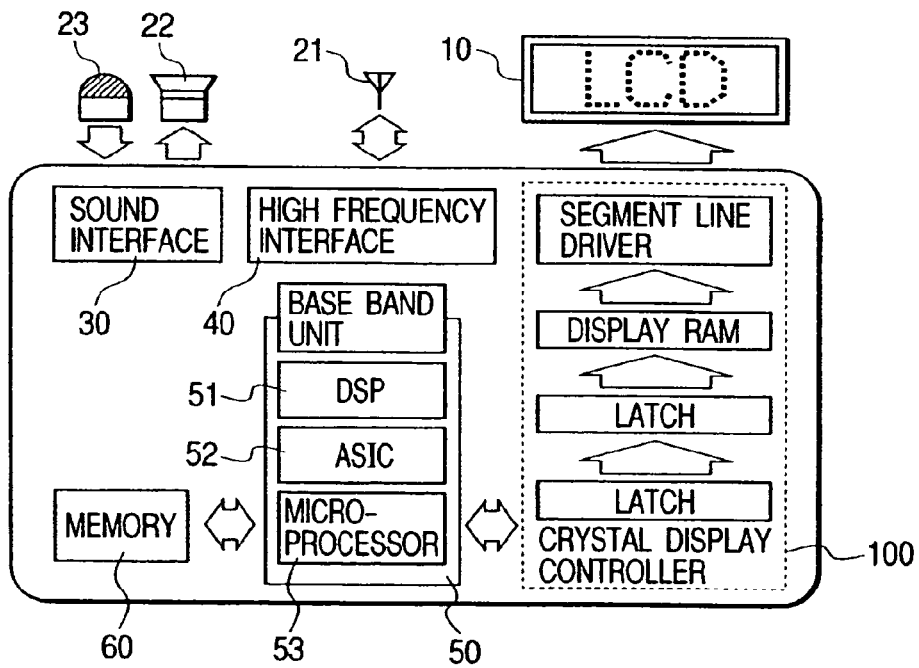

Further in the system of this configuration, a segment driver for driving segment electrodes (e.g., 384 segment electrodes) of the liquid crystal panel 10 is built into the liquid crystal control driver 100, and a common driver 70 for driving common electrodes (e.g., 176 common electrodes) of the liquid crystal panel 10 is configured over another semiconductor chip. However, this configuration is not absolutely required, but the liquid crystal control driver 100 may have both a segment driver and a common driver built into it as illustrated in FIG. 1(B) for example.

Figure 2:
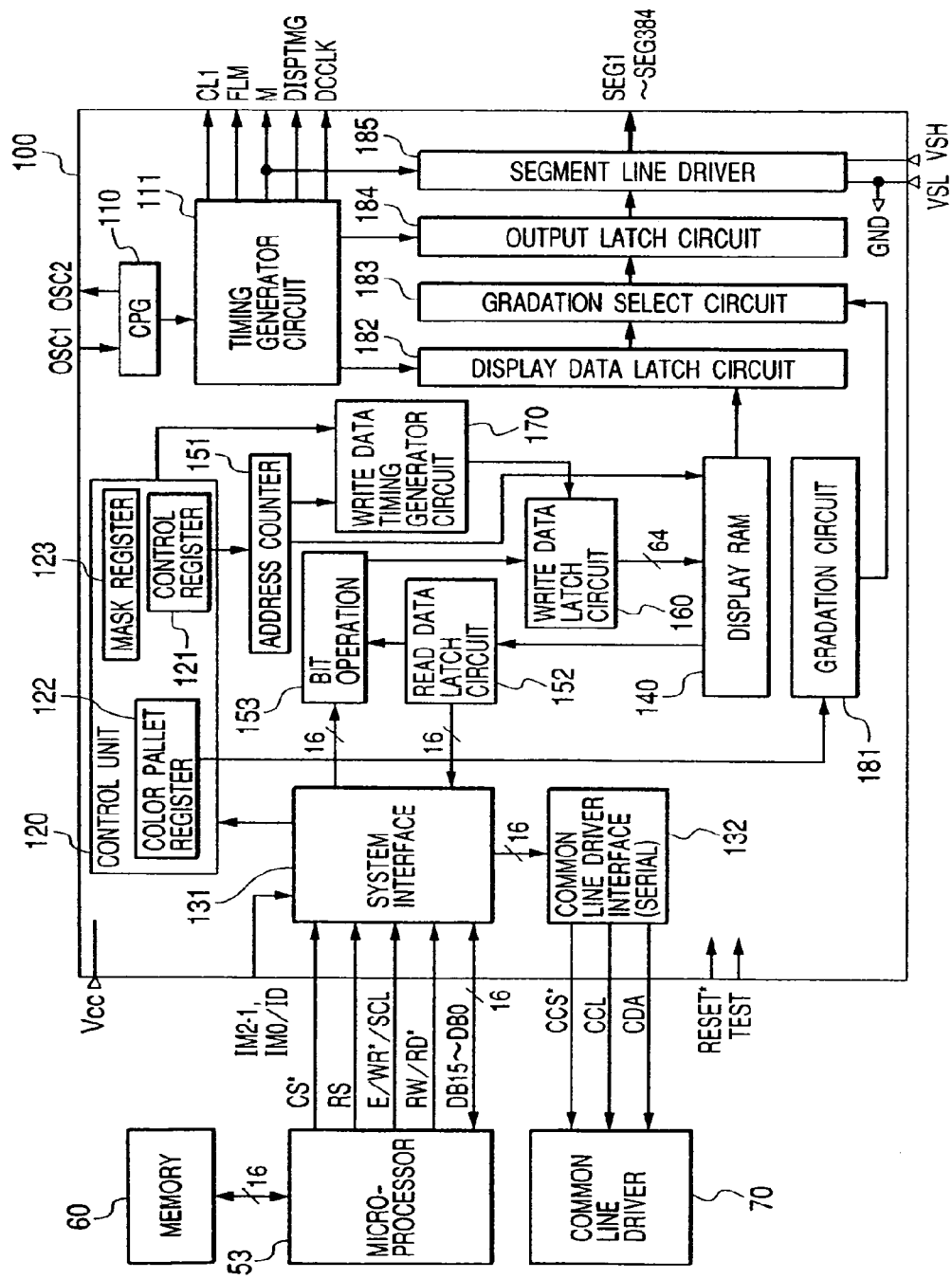
FIG. 2 is a block diagram showing details of the liquid crystal control driver embodying the invention.

FIG. 2 is a block diagram showing an example of liquid crystal control driver 100 having the configuration of FIG. 1(A).

This example of liquid crystal control driver 100 is provided with a pulse generator 110 for generating a reference clock pulse within the chip on the basis of an oscillation signal from an external source or an oscillation signal from an oscillator connected to an external terminal, a timing generator 111 for generating a timing control signal within the chip on the basis of this clock pulse, a control unit 120 for controlling the whole chip inside in accordance with an instruction from the external microprocessor 53, a system interface 131 for transmitting and receiving data to and from the microprocessor 53, a common driver interface 132 for supplying the external common driver chip 70 with a control signal CS, a clock signal CCL, a command CDM and so forth, and a display random access memory (RAM) 140 as a display memory for storing display data in a bit map system. The display RAM is configured with 176 word lines×1024 bits for instance, and operates at a speed of about 2 MHz.

In this example of liquid crystal control driver 100, there are also provided an address counter 151 for generating addresses for the display RAM 140; a read data latch circuit 152 for holding data read out of the display RAM 140; a bit operation circuit 153, equipped with a logical operation means for performing logical operations for watermark displaying and superposed displaying on the basis of data read out to the read data latch circuit 152, i.e. already displayed contents, and new display data supplied from the microprocessor 53 and a bit shift means for scroll displaying, for performing bit processing on write data from the microprocessor 53 or read data from the display RAM 140; a write data latch circuit 160 for taking in data having undergone bit processing and writing data into the display RAM 140; and a write timing generator 170 for generating a timing signal for the write data latch circuit 160 on the basis of signals from the control unit 120 and the address counter 151. Where neither watermark displaying nor superposed displaying is needed, data supplied from the microprocessor 53 just pass the bit operation circuit 153 and are transmitted to the write data latch circuit 160. Incidentally, the speed of data writing from the microprocessor 53 into the write data latch circuit 160 is set to be about 10 MHz, for instance.

This example of liquid crystal control driver 100 is further provided with a PWM gradation circuit 181 for generating waveform signals suitable for color displaying and gradation displaying; a display data latch circuit 182 for holding display data read out of the display RAM 140 for displaying on the liquid crystal panel; a gradation control circuit 183 for selecting a waveform signal suitable for the display data out of the waveform signals supplied from the PWM gradation circuit 181 on the basis of the display data held by the display data latch circuit 182; an output latch circuit 184 for holding the selected gradation data; and a segment driver 185 for outputting segment drive signals SEG1 through SEG384 to be applied to the segment electrodes of the liquid crystal panel 10 on the basis of the data latched by the output latch circuit 184.

This segment driver 185 is configured to be able to accept the application of a liquid crystal drive voltage VS supplied from the common driver chip 70. This configuration to allow the supply of the liquid crystal drive voltage VS from outside enables this example of liquid crystal control driver 100 to dispense with an internal power supply circuit, and this makes it possible to configure the whole chip circuitry of an element of a lower withstand voltage (MOSFET) than where a power supply circuit is built in. On the other hand, the common driver chip 70 is configured of an element relatively high in withstand voltage. If the segment driver and the common driver were formed over the same chip, a process to form an element of a higher withstand voltage and another process to form an element of a lower withstand voltage would be required and thus complicate the whole process, but the use of different chips serves to simplify the process.

The control unit 120 is provided with registers including a control register 121 for controlling the operating state of the whole chip including the operating mode of this liquid crystal control driver 100, a color palette register 122 in which are stored data for color displaying, and a mask register 123 for storing mask data for prohibiting the writing of some data when data are to be written into the display RAM 140. The control unit 120 can be controlled in any suitable manner, for instance by generating, upon receiving a command code from the microprocessor 53, a control signal by decoding this command or by providing in advance in the control unit a plurality of command codes and a register for designating the command to be executed (known as an index register) and generating a control signal by having the microprocessor 53 write into the index register to designate the command to be executed.

Under the control of the control unit 120 configured as described above, the liquid crystal control driver 100, when performing display on the liquid crystal panel 10 on the basis of an instruction and data from the microprocessor 53, processes drawing by successively writing display data into the display RAM 140, while performing read processing to read display data successively from the display RAM 140 to form signals to be applied to, and to drive, the segment electrodes of the liquid crystal panel 10.

The system interface 131 transmits and receives to and from the microprocessor 53 data to be written into the registers needed when drawing onto the display RAM and signals including display data. Between the microprocessor 53 and the system interface 131, there are provided control signal lines over which are transmitted a chip select signal CS* for selecting the chip to which data are to be transmitted, a register select signal RS for selecting the register into which the data are to be stored and read/write control signals including E/WR*/SCL and RW/RD*, and data signal lines over which are transmitted 16-bit data signals DB0 through DB15 including register setting data and display data.

E/WR*/SCL and RW/RD* are made available as read/write control signals to ensure compatibility with three kinds of inputs/outputs including those to and from 68-type MPUs, Z80-type MPUs and serial clock synchronism. More specifically, the control signals RS, E and RW are compatible with 68-type MPUs, WR* and RD*, with Z80-type MPUs, and SCL, for inputting/outputting in synchronism with a serial clock. Signals whose signs are marked with * are signals whose effective level is the low level.

The timing generator 111 has functions to generate and supply, in addition to timing signals for the read data latch circuit 182, the latch circuit 184 for holding gradation data and the segment driver 185, various timing signals CL1, FLM, M, DISPTMG and DCCLK to the external common driver chip to achieve synchronism with the drive of the segment electrodes.

Figure 3:
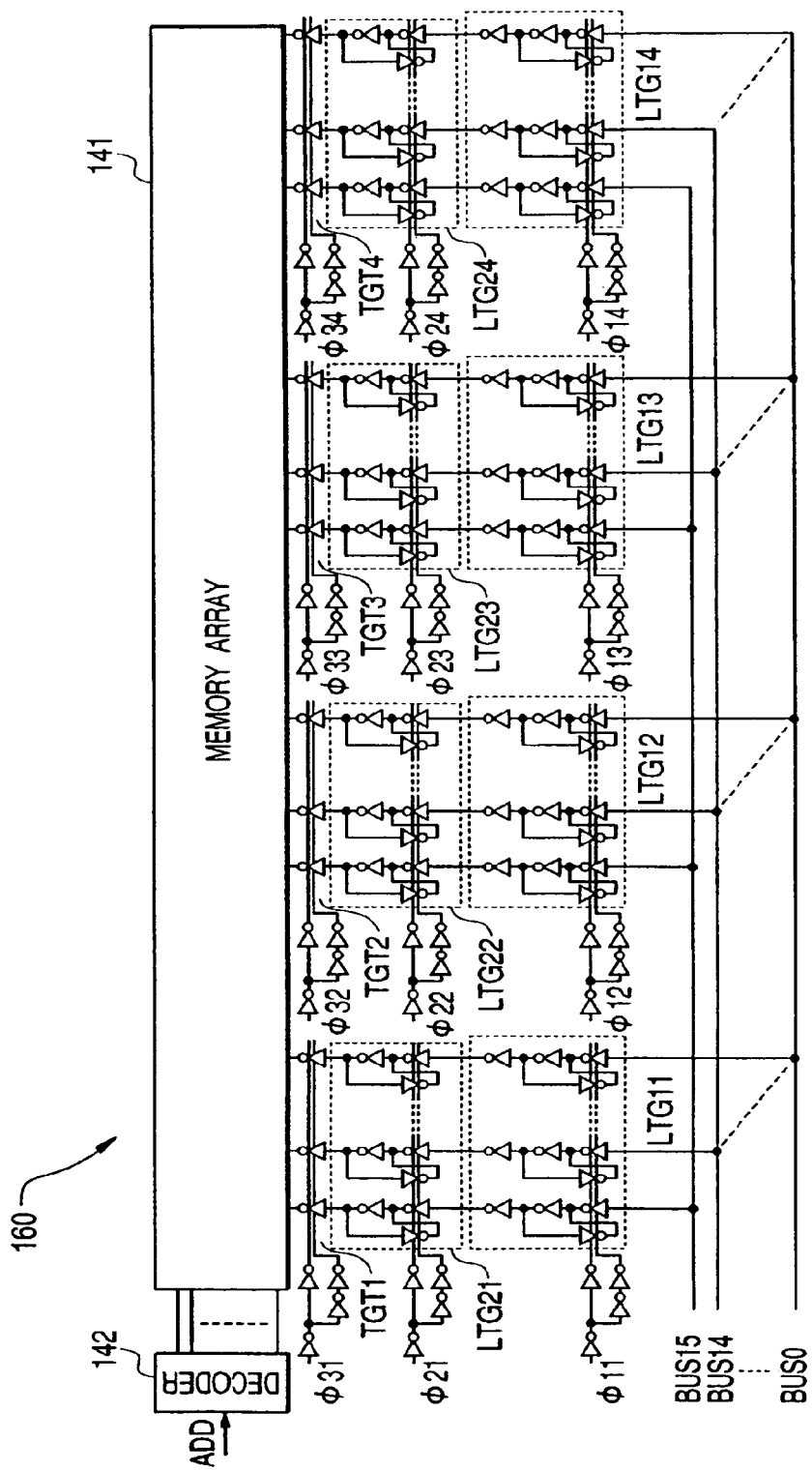
FIG. 3 is a circuit diagram illustrating a specific example of write data latch circuit of a display RAM in the liquid crystal control driver.

FIG. 3 illustrating a specific example of circuitry for the write data latch circuit 160.

This example of write data latch circuit 160 is configured of first latch groups LTG11 through LTG14 consisting of 16 latch circuits connected to 16-bit data bus signal lines BUS0 through BUS15 and each capable of latching 16-bit data at the same time, second latch groups LTG21 through LTG24 provided between the first latch groups LTG11 through LTG14 and the memory array 141 of the display RAM 140 and consisting of the same number of latch circuits as the first latch groups, and transfer gate groups TGT1 through TGT4 provided on the output terminal side of the second latch groups LTG21 through LTG24. Incidentally, not all the latch circuits provided in the write data latch circuit 160 are shown in FIG. 3, but there are provided altogether 16 units, each unit configured as shown in FIG. 3. Thus there are provided first and second latch groups for (16 bits×4)×16 units=1024 bits. Incidentally, in color displaying, gradation control of one picture element (three dots of red, blue and green) is accomplished with, for example, eight-bit data.

This example of write data latch circuit 160 is controlled with timing signals $\phi 11$ through $\phi 14$, $\phi 21$ through $\phi 24$ and $\phi 31$ through $\phi 34$ supplied from the write timing generator 170. The write timing generator 170 generating the timing signals $\phi 11$ through $\phi 21$ through $\phi 24$ and $\phi 31$ through $\phi 34$ are configured so as to generate timing signals $\phi 11$ through $\phi 14$, $\phi 21$ through $\phi 24$ and $\phi 31$ through $\phi 34$ differing between the consecutive writing mode and the collective writing mode, as according to the prior art, in accordance with the setpoint of the control register 121 in the control unit 120.

Figure 4:
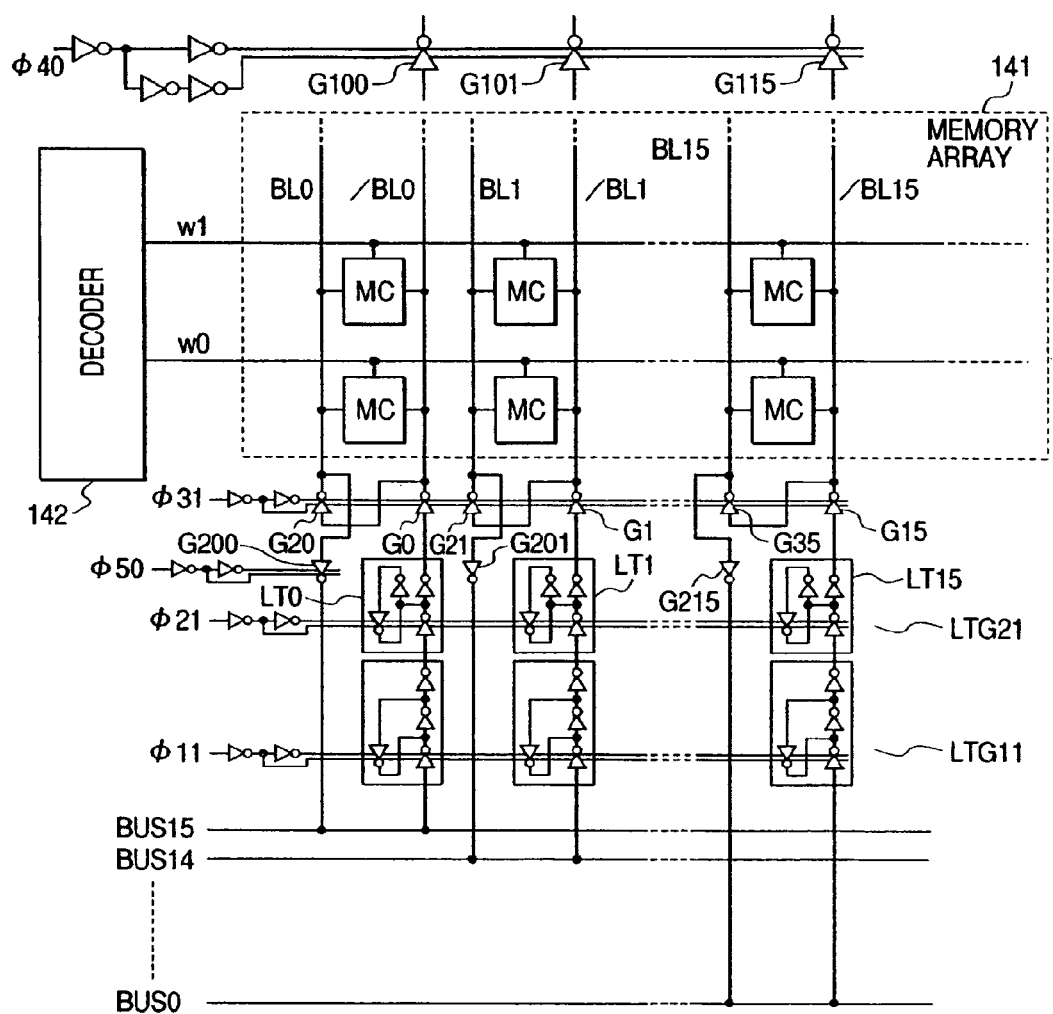
FIG. 4 is a circuit diagram illustrating a more specific example of memory array and write data latch circuit.

FIG. 4 illustrates a specific example of memory array 141 and transfer gate groups TGT. In the memory array 141, a plurality of word lines W0, W1 . . . and complementary bit lines BL0, /BL0; BL1, /BL1 . . . are arranged in mutually crossing directions, and a memory cell MC is arranged in each of the boxes formed by the word lines W0, W1 . . . and the complementary bit lines BL0, /BL0; BL1, /BL1 . . . The memory cells MC are static memory cells of the known six-element type, and a pair of input/output terminals of each memory cell MC are connected to one of the complementary bit lines BL0, /BL0; BL1, /BL1 . . . ; BL15, /BL15, and the selection terminal of each memory cell MC is connected to one of the word lines W0, W1 . . . .

The transfer gate group TGT consists of first clocked inverters G0, G1 . . . G15 of which the input terminals are connected to the output terminals of latch circuits LT0, LT1 . . . LT15 constituting the second latch groups LTG21 through LTG24 and the output terminals are connected to either of the complementary bit lines BLi and /BLi (i=0 through 15) (e.g. /BLi) and second clocked inverters G20, G21 . . . G35 of which the inputs are the outputs of the inverters G0, G1 . . . G15 and the output terminals are connected to either of the complementary bit lines BLi and /BLi (i=0 through 15) (e.g. BLi).

The clocked inverters G0, G1 . . . G15, G20, G21 . . . G35 connected to BLi of these complementary bit lines BLi and /BLi (i=0 through 15) are so configured that they are controlled with the same timing control signal $\phi 31$; transmit the output signals of the latch circuits LT1, LT2 . . . LT16 to the complementary bit lines BL0, /BL0; BL1, /BL1 . . . ; BL15, /BL15 when the gate is opened, and write into the memory cells MC connected to the word line then placed at the selection level.

To the other ends of /BL0, /BL1, /BL15 out of the complementary bit lines BL0, /BL0; BL1, /BL1 . . . ; BL15 and /BL15 are connected the input terminals of the clocked inverters G100, G101 . . . G115 for display read use. The configuration is such that control is accomplished with a timing control signal $\phi 40$ and, when the gate is opened, the levels of the bit lines /BL0, /BL1 . . . /BL15 are detected, and read data from the memory cells MC connected to the word line then placed at the selection level are outputted. These read data are transferred to the display data latch circuit 182 shown in FIG. 2. The bit lines to which the clocked inverters G100, G101 . . . G115 for display read use may as well be BL0, BL1 . . . BL15.

To the leading edges of BL0, BL1, . . . BL15 out of the complementary bit lines BL0, /BL0; BL1, /BL1 . . . ; BL15 and /BL15 are connected the clocked inverters G200, G201 . . . G215 for operational read use which, controlled with a timing control signal $\phi 50$, detect the levels of the complementary bit lines BL0, BL1 . . . BL15 when the gate is opened, and output read data from the memory cells MC connected to the word line then placed at the selection level. These read data are transferred to the read data latch circuit 152 shown in FIG. 2. The bit lines to which the clocked inverters G200, G201 . . . G215 may as well be /BL0, /BL1 . . . /BL15.

Figure 5A:
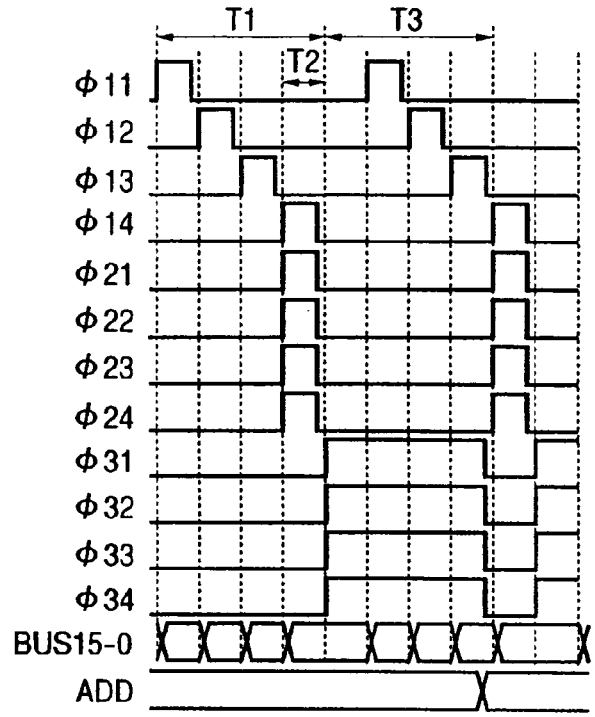
FIGS. 5A and 5B are timing charts showing the waveforms of the latch timing signal in the display control driver embodying the invention in the mode of collective writing and in the mode of consecutive writing into the display RAM.

FIG. 5(A) shows the waveforms of the timing signals $\phi 11$ through $\phi 14$, $\phi 21$ through $\phi 24$ and $\phi 31$ through $\phi 34$ where the mode of writing into the display RAM 140 in this example of display control driver is the collective writing mode.

In this collective writing mode, first signals on the data bus BUS0 through BUS15 are successively taken into the first latch groups LTG11 through LTG14, 16 bits at a time, in accordance with the timing signals $\phi 11$ through $\phi 14$ (period T1). At the same time as the final 16 bits, i.e. data of the fourth word, are taken into LTG14, data of four words latched by the first latch groups LTG11 through LTG14 are taken into the second latch groups LTG11 through LTG14 in accordance with the timing signals $\phi 21$ through $\phi 24$ (period T1).

After that, the transfer gate groups TGT1 through TGT4 are opened at the same time in accordance with the timing signals $\phi 31$ through $\phi 34$. Four words of data latched by the second latch groups LTG21 through LTG24 are transferred to bit lines on of the memory array 141 of the display RAM and, as an address ADD from the address counter 151 is decoded by a decoder (DEC) 142, the transferred data are written into the memory cells MC connected to the word line then placed at the selection level (period T3). During this writing of data into the memory array, the next data are taken into the first latch groups LTG11 through LTG14.

Figure 5B:
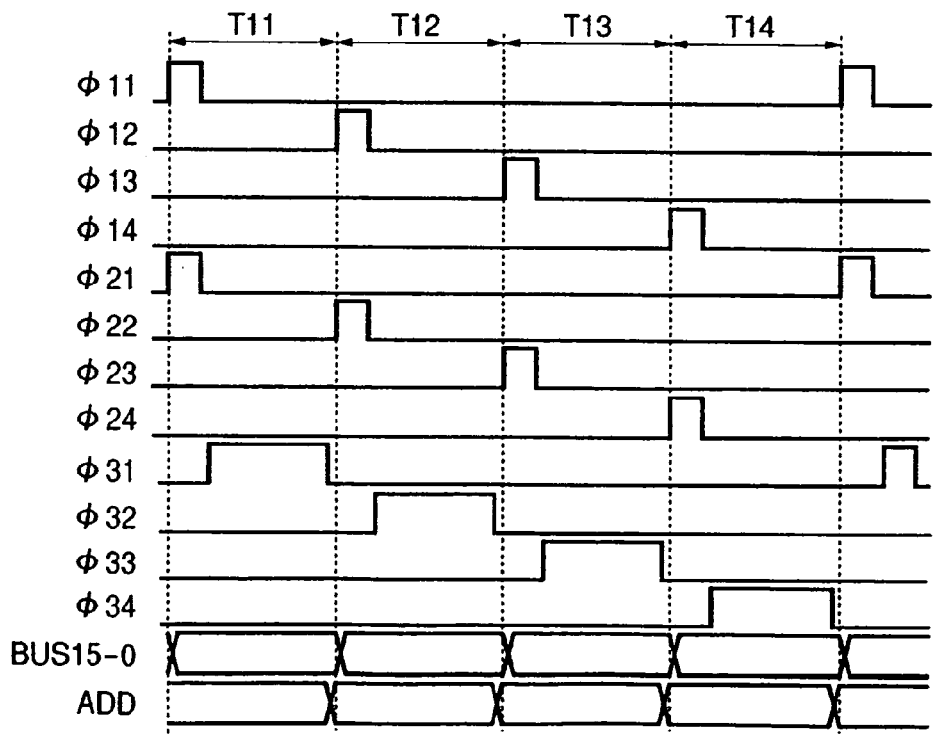

FIG. 5(B) shows the waveforms of the timing signals $\phi 11$ through $\phi 14$, $\phi 21$ through $\phi 24$, $\phi 31$ through $\phi 34$ in the consecutive writing mode.

In this consecutive writing mode, the signals $\phi 11$ through $\phi 14$ and $\phi 21$ through $\phi 24$ are treated as signals of the same timing. First, 16-bit signals on the data bus BUS0 through BUS15 are taken into the first latch group LTG11 of the first latch groups in accordance with the timing signal $\phi 11$, and at the same time the same data are taken in as they are into the second latch groups LTG21 in accordance with the timing signal $\phi 21$. Then, the transfer gate group TGT1 is opened in accordance with the timing signal $\phi 31$, and data of one word latched by the second latch group LTG21 are transferred over the bit line matching the memory array of the display RAM 140 to accomplish writing into memory cells (period T11).

Then, 16-bit signals on the data bus BUS0 through BUS15 are taken into the second latch group LTG12 of the first latch groups in accordance with the timing signal $\phi 12$, and at the same time the same data are taken into the second latch groups LTG22 as they are in accordance with the timing signal $\phi 22$. After that, the transfer gate groups TGT2 is opened in accordance with the timing signal $\phi 32$, and data of one word latched by the second latch groups LTG22 are transferred over the bit line matching the memory array of the display RAM 140 to accomplish writing into memory cells (period T12).

In this way, 16-bit signals on the data bus BUS0 through BUS15 are successively written into the memory array. However, in this consecutive writing mode, it is no need to cause the first latch groups LTG11 through LTG14 to take in and write data in this sequence, but this can be done in any desired sequence, such as LTG12, LTG14, LTG13, LTG11 . . . for instance.

As is evident from the comparison of FIGS. 5(A) and 5(B), the use of the collective writing mode serves not only to shorten the length of time required for writing but also to save power consumption. In the consecutive writing mode, more power is consumed because every time data of one word are written a word line has to be actuated even if memory cells are connected to the same word, but in the collective writing mode a word line needs to be actuated only once, with a corresponding saving in power consumption, because data of four words can be written at the same into memory cells connected to the same word. In other words, the use of the collective writing mode allows the number of times of data writing into the memory array to be reduced even if data are taken into latch circuits at higher speed, so that in the consecutive writing mode four times as large a quantity of data can be written per word of data without increasing the length of time required for writing or power consumption.

While in this embodiment of the invention data of four words are successively taken into the latch circuits and collectively written into the memory array, it is also possible to use a configuration in which data of five or more words are collectively written into the memory array after they are taken into latch circuits successively. However, if the quantity of data to be collectively written is increased excessively, even where part of data in the display RAM 140, data of only one word, for example, are to be rewritten, data equivalent to a plurality of words will have to be sent to the latch circuits, resulting in an increased load on the microprocessor and, if writing into non-consecutive addresses takes place, in an increase in overhead as well.

Therefore, the quantity of data to be written collectively should be determined according to the data write size which takes place in the system relatively frequently. The system of this embodiment of the invention is configured for collective writing of four words of data.

FIG. 6(A) shows the relationship between each word (16-bit data) and the address in writing data into all the memory cells in the display RAM 140, for instance, in a system using the liquid crystal control driver 100 embodying the invention in this way. In this chart, addresses "0000" through "003F" on line 1 represent the addresses of data of 1024 bits (64 words) equivalent to one line on the liquid crystal panel 10, and these one line equivalent of data are stored, though not absolutely necessarily, in 1024 memory cells connected to one word line of the display RAM 140.

The data in the shaded part of FIG. 6(A) are data of four words having addresses "0000" through "0003", and these data of four words are supplied, in the collective writing mode, word by word from an external microprocessor and successively written into the first latch groups LTG11 through LTG14. When all the four words are ready, the data are transferred to the second latch groups LTG21 through LTG24 and written into memory cells matching addresses "0000" through "0003" in the display RAM 140.

In parallel with the start of writing these data of four words, the data of four words of next addresses "0004" through "0007" are supplied word by word from the external microprocessor, successively written into the first latch groups LTG11 through LTG14, transferred to the second latch groups LTG21 through LTG24 when all the four words are ready, and written into matching memory cells in the display RAM 140. By repeating the operation described above, data can be written efficiently in a short period of time. In addition, the number of accesses to the display RAM 140 (actions to actuate word lines) can be fewer than when data are written word by word, with a corresponding saving in power consumption.

FIG. 6(B) shows the relationship between write data from the microprocessor where data of some of the addresses in the display RAM 140 are to be rewritten in the collective writing mode in a system using the liquid crystal control driver 100 of this embodiment and data transferred from the first latch groups LTG11 through LTG14 to the display RAM 140. Out of the data of eight words of addresses "0000" through "0007" in the shaded part of FIG. 6(A), data of four words from "0001" through "0004" are supposed to be write data actually desired to be rewritten.

In this case, the microprocessor adds dummy data of one word of address "0000" and dummy data of three words of addresses "0005" through "0007". First, data of four words of addresses "0000" through "0004" including the dummy data are successively supplied to and written into the first latch groups LTG11 through LTG14 word by word. When all the four words are ready, data of three words of them, excluding the dummy data, are transferred to the second latch groups LTG21 through LTG24 and written into matching memory cells in the display RAM 140.

In parallel with the start of writing these data of four words, the data of four words of next addresses "0004" through "0007" including the three words of dummy data, are supplied word by word from the external microprocessor, successively written into the first latch groups LTG11 through LTG14, transferred to the second latch groups LTG21 through LTG24 when all the four words are ready, and written into matching memory cells in the display RAM 140. Incidentally, the configuration is such that the consecutive addresses used in writing are automatically generated by the setting of the leading address of the write position in the address counter 151 by the external microprocessor and counting up by the address counter 151.

FIG. 7 and FIG. 8 show the relationships between the address range of data to be rewritten and the number of times of data writing into the first latch groups LTG11 through LTG14. In the drawings, the addresses surrounded by bold lines denote the data to be rewritten. Of these drawings, FIG. 7 shows addresses of data to be written having neat breaks, and FIG. 8, addresses each spanning two or more out of groups of four words each.

As is seen from FIG. 7 and FIG. 8, where the address of data to be rewritten spans two or more out of groups of four words each as shown in FIG. 8, the number of times of writing is greater by the number of words of dummy data than an address having neat breaks at every fourth word as shown in FIG. 7, and the number of writing into the display RAM 140 is correspondingly greater, but the number of data writing into the display RAM is smaller than in the mode of writing one word at a time, resulting in a corresponding reduction in power consumption.

Next will described a configuration for addresses data to be rewritten spanning two or more groups of four words each as shown in FIG. 8(B), out of the data of four words including dummy data written into the first latch groups LTG11 through LTG14, and only the non-dummy data can be transferred to the second latch groups LTG21 through LTG24 and written into matching memory cells into the display RAM 140.

Such selective data writing is made possible by setting into the mask register 123 provided in the control unit 120 as described above. More specifically, in the mask register 122 are set a write start address setting field WSA, a mask amount for start side setting field SMW in which to set the number of words from the start of masking, a write end address setting field WEA, and a mask amount for end side setting field EMW in which to set the number of words back from the end of masking, as shown in FIG. 9(A). Incidentally, two bits each are sufficient for the mask amount for start side setting field SMW and the mask amount for end side setting field EMW because the unit of collecting writing is four words in this embodiment. The mask amount, as it is automatically determined by the write start address and the write end address, need not be set by the microprocessor 53. Where the unit of collective writing is eight words, three bits each can be assigned to the mask amount for start side setting field SMW and the mask amount for end side setting field EMW.

Then, when the external microprocessor 53 starts writing data into the first latch groups LTG11 through LTG14 after setting into this mask register 123 the timings signal φ31 through φ34 . . . which transfer only non-dummy data from the write timing generator 170 to the transfer gate means TGT1 through TGT4 . . . shown in FIG. 3 when transferring data from the first latch groups LTG11 through LTG14 to the display RAM 140 after the completion of data writing.

Specific data masking by setting into this mask register 123 will now be described with reference to four cases of writing data of 6 to 12 words as shown in FIG. 9(B) by way of example.

In FIG. 9(B), the relationships between the data to be masked (dummy data) and data to be written into the display RAM are shown: in the first case in data of 12 words are written into addresses "0000" through "000B" having neat breaks; in the second case, data of 10 words are written into intermediate addresses "0001" through "000A"; in the third case, data of eight words are written into intermediate addresses "0002" through "0009"; and in the fourth case, data of six words are written into addresses "0003" through "0008".

In FIG. 9(B), blank boxes (□ marks) signify data to be written, and filled boxes (■ marks), data to be masked. In both cases, data to be written from the external microprocessor into the first latch groups LTG11 through LTG14 are data of 12 words. FIG. 9(C) shows values to be set into the mask register 122 to match cases 1 through 4. The end address may as well be the leading address "0008" of the final group instead of "000B".

Figure 10A:
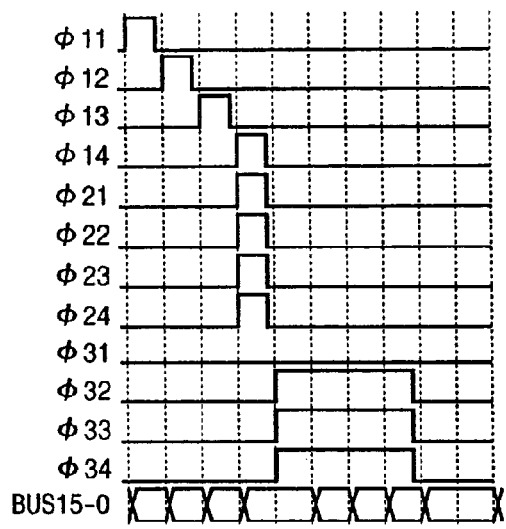
FIGS. 10A to 10D are waveform diagrams of the latch timing signals when setting is done into the mask register.

FIG. 10(A) shows waveforms of timing signals φ11 through φ14, φ21 through φ24 and φ01 through φ34 supplied to matching ones in the first latch groups LTG11 through LTG14, the second latch groups LTG21 through LTG24 and the transfer gate groups TGT11 through TGT14, when data of 10 words for addresses "0001" through "000A" of case 2 are to be written into the display RAM 140, the data of addresses "0000" through "0003".

Figure 10B:
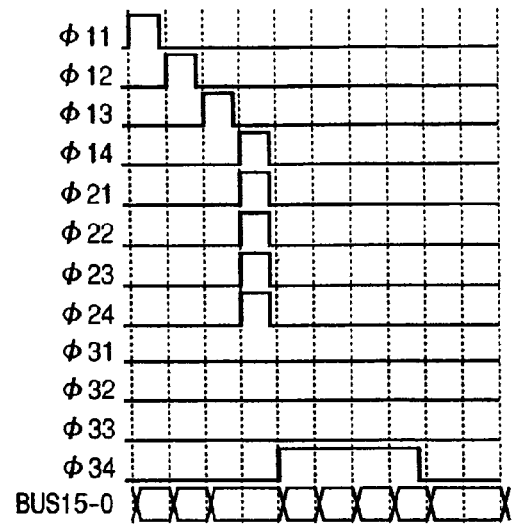

Further, FIG. 10(B) shows waveforms of timing signals φ11 through φ14, φ21 through φ24 and φ31 through φ34 supplied to matching ones in the first latch groups LTG11 through LTG14, the second latch groups LTG21 through LTG24 and the transfer gate groups TGT11 through TGT14, when data of eight words for addresses "0003" through "0008" of case 4 are to be written into the display RAM 140, the data of addresses "0000" through "0003".

It will be appreciated that the foregoing embodiment of the invention is merely exemplary and that various modifications can be made in keeping with the basic principles thereof.

For instance, while in the embodiment the first latch groups LTG11 through LTG14, the second latch groups LTG21 through LTG24 and the transfer gate groups TGT1 through TGT4 are provided between the buses BUS0 through BUS15 and the memory array 141, it is also possible to dispense with the second latch groups LTG21 through LTG24 and have the data held by the first latch groups LTG11 through LTG14 transferred by the transfer gate groups TGT1 through TGT4 to the bit lines of the memory array 141. In this configuration, 64 bits can be collectively written as described above.

Figure 10C:
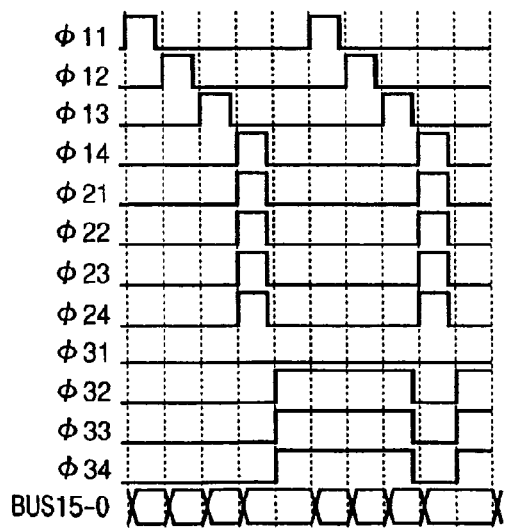
Figure 10D:
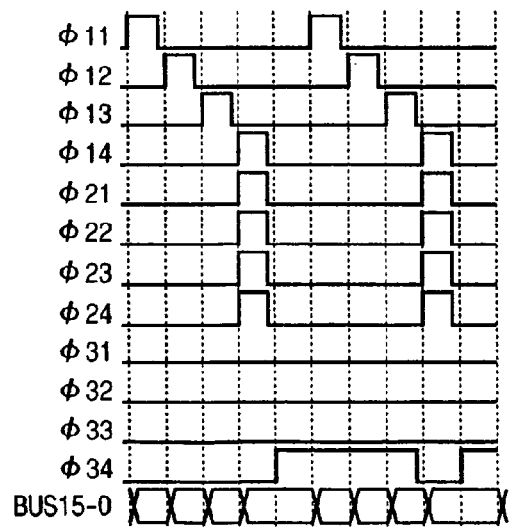
Figure 11:
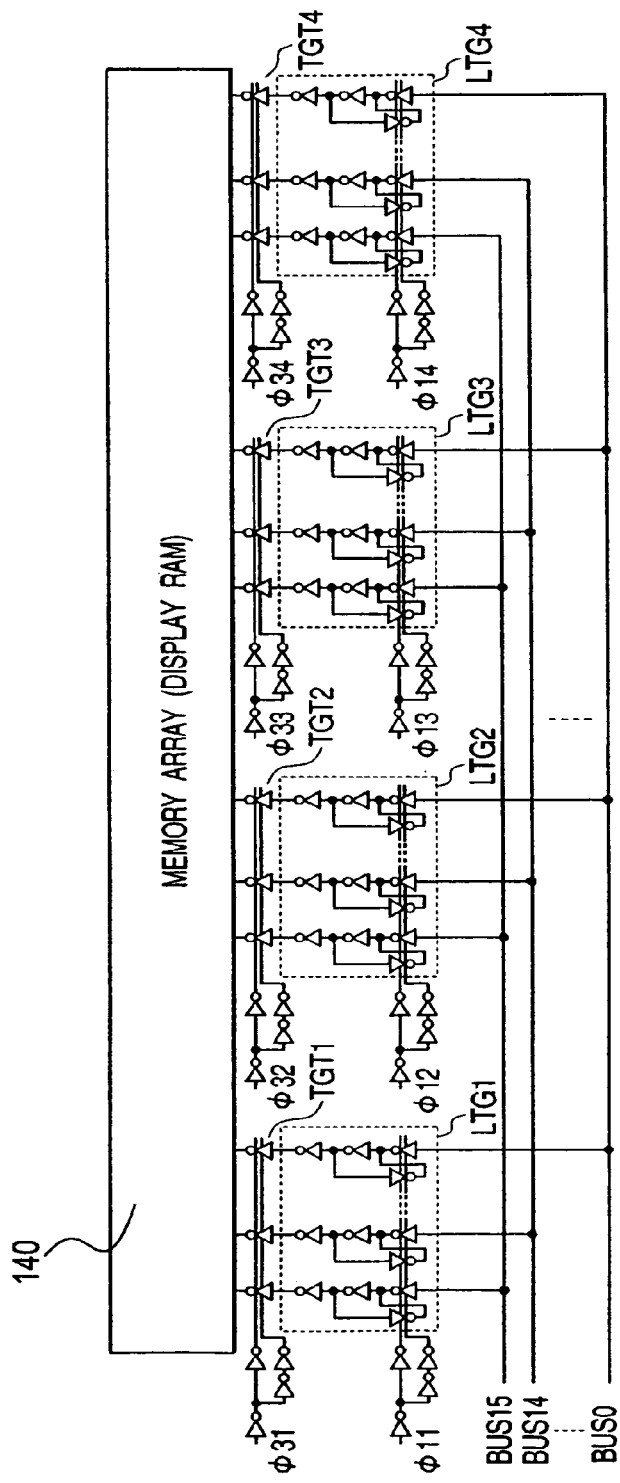
FIG. 11 is a circuit diagram of an example of configuration of the latch circuit for latching write data into a display memory in a conventional liquid crystal controller driver.
Figure 12:
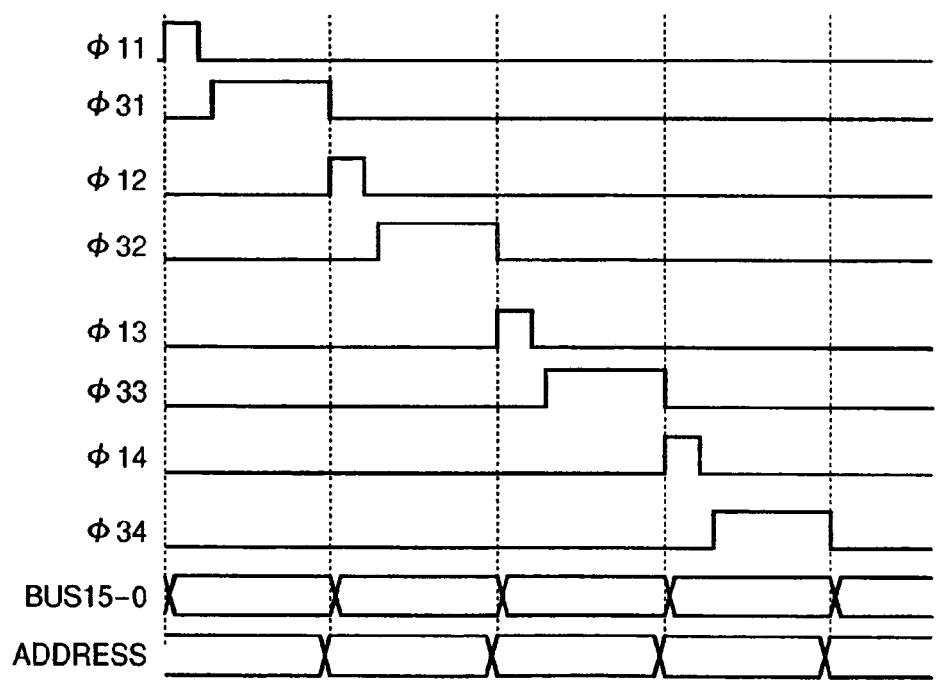
FIG. 12 is a timing chart showing an example of the timing of latching data into the display memory in the conventional liquid crystal controller driver and the timing of writing data into the display memory.

However, where the first latch groups LTG11 through LTG14 and the second latch groups LTG21 through LTG24 are provided as in this embodiment, if data have to be consecutively written into memory cells on the same bit line as in FIG. 7(C), it is possible, while the data first taken in are transferred and written into the memory array as in FIGS. 10(C) and 10(D), to take in the next data into the first latch groups LTG11 through LTG14 in parallel. In this case, too, it is possible to prevent the first one of the four words taken into the first latch groups LTG11 through LTG14 according to the setpoint in the mask register from being transferred to the memory array.

Although the foregoing description of the invention mainly referred to the display device for mobile telephones, which constitutes a field of application constituting the background of the invention, the invention is not limited to this application, but can also be applied to various portable electronic devices including personal handy phones (PHS), Pocket Bells and pagers. The invention can be applied not only to portable electronic devices and liquid crystal display units but also extensively to, for instance, display devices and their control units in large equipment and dot display devices in which LEDs or the like are two-dimensionally arrayed.

Thus, according to various embodiments of the present invention, it is possible to realize a display control device capable of writing data into an internal display RAM at high speed without increasing power consumption and a mobile electronic apparatus mounted therewith.

Figure 13:
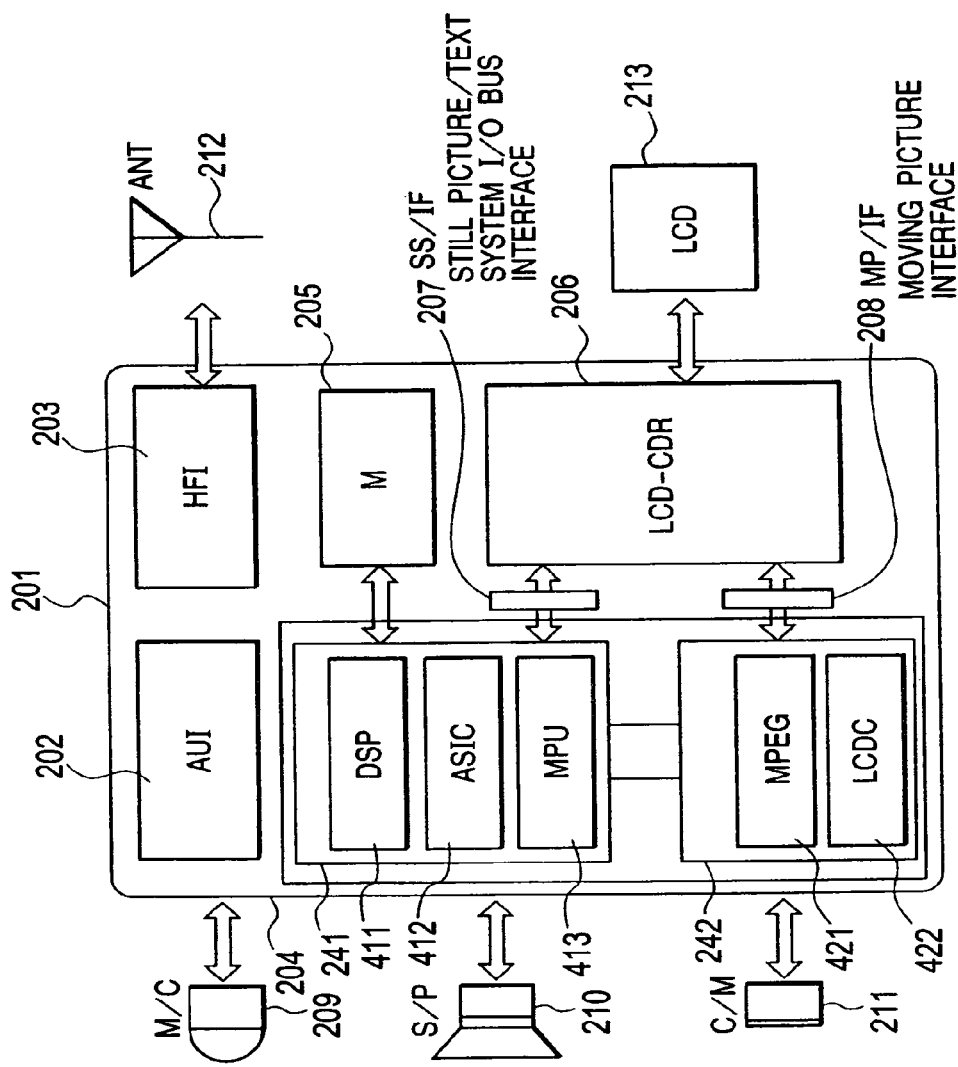
FIG. 13 is a diagram for describing a total configuration of an embodiment of the present invention.

FIG. 13 is a diagram for describing another embodiment of the present invention and a block diagram for explaining an embodiment of a drive circuit system configuration of a mobile telephone including a moving picture interface (namely, including a first port to which moving picture data is transferred) referred to as a first function as an example of the display drive control circuit of the present invention. This display drive control circuit 201 is composed of an audio interface (AUI) 202 similar to that of FIG. 32, a high frequency interface (HFI) 203, a picture processor 204 as a picture data processor, a memory 205 as a picture display memory, a liquid crystal controller driver 206 (LCD-CDR) as a display drive control circuit, a still-picture-text-system-I/O bus-interface (SS/IF) 207 as a second function (namely, including a second port to which the still picture data is transferred).

The memory 205 is a frame memory (bit map memory) for storing the display data as many as at least one frame of picture. This memory is hereinafter referred to as a graphic RAM. Moreover, in the description of the embodiments, the still-picture-text-system-I/O bus-interface (SS/IF) 207 is sometimes described as a system interface 207 or moving picture interface.

The picture processor 204 is provided with an application processor (APP) 242 including a moving picture processor (MPEG) 421 and a liquid crystal display controller (LCDC) 422 in addition to a baseband processor 241 including a digital signal processor (DSP) 411, ASIC 412 and a microcomputer MPU. Reference numeral 209 designates a microphone (M/C); 210, a speaker (S/P); 211, a video camera (C/M); 212, an antenna (ANT); 213, a liquid crystal panel (liquid crystal display; LCD). The ASIC 412 also includes peripheral circuit functions which are required for the other mobile telephone system configuration. Moreover, the picture processor 204 may be formed on single semiconductor substrate (chip) like a single crystalline silicon or the baseband processor 241 and application processor 242 may respectively be formed on single semiconductor substrate (chip).

Figure 33:
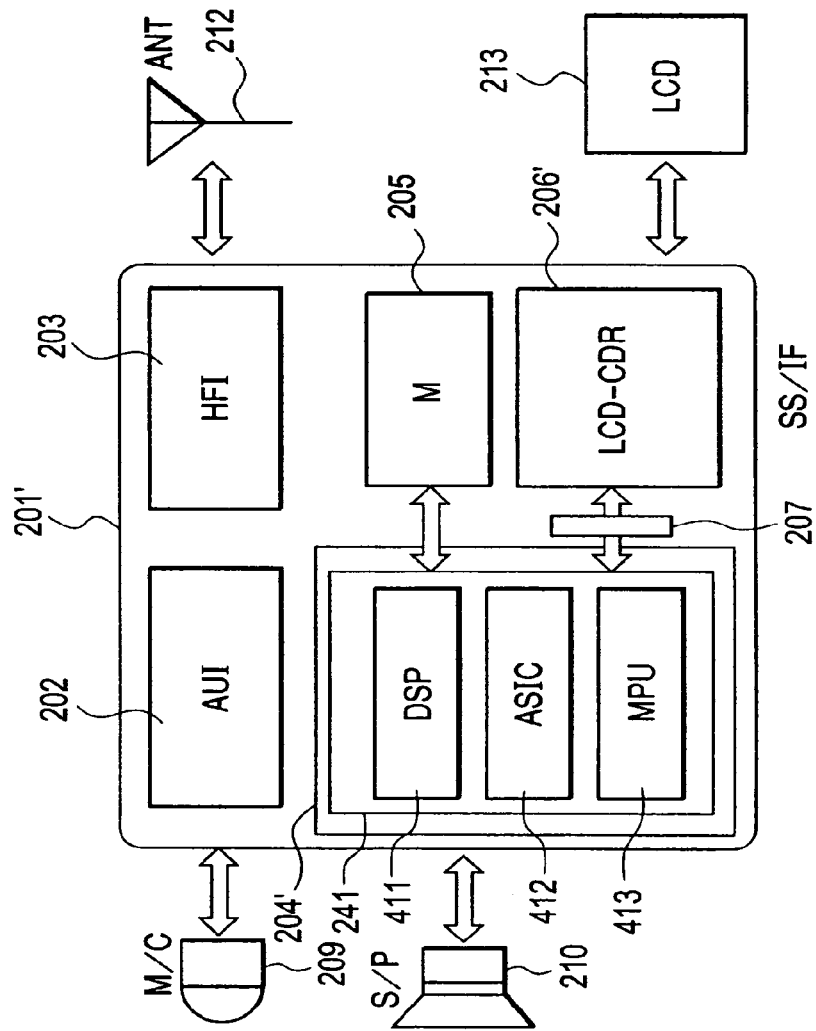
FIG. 33 is a block diagram for describing an example of a system configuration of a drive control circuit of a mobile telephone including no moving picture interface as an example of the display drive control circuit which has been considered by inventors of the present application.
Figure 34:
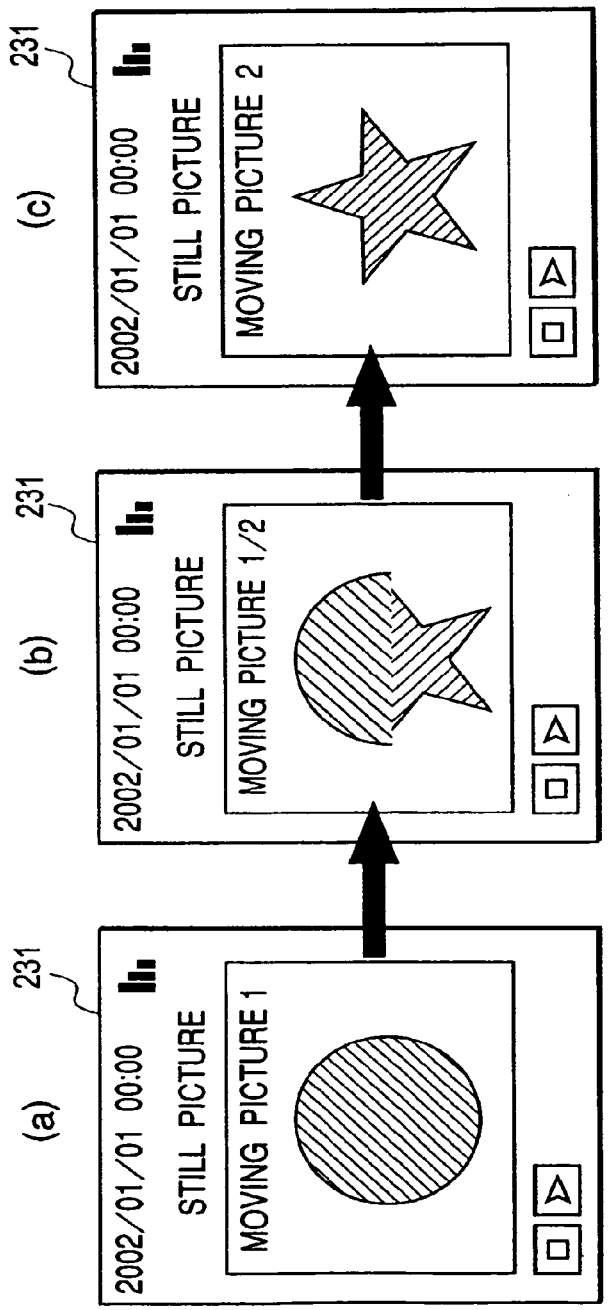
FIG. 34 is a schematic diagram for describing an change operation example at the time of displaying moving pictures in the system configuration of FIG. 33.

A baseband processor BBP which is provided in general in the mobile telephone system illustrated in FIG. 33 is insufficient in its moving picture processing capability. In addition to this baseband processor BBP, an sub-MPU referred to as an application processor (APP) is also known. The application processor (APP) 242 of FIG. 13 also comprises a built-in MPEG processor (MPRG) 421 for the MPEG moving picture process. In addition, the application processor (APP) 242 transfers picture data to the liquid crystal controller driver (LCD-CDR) 206 with the moving picture interface (MP/IF) 208. Still picture display data and text display data are transferred to the liquid crystal controller driver (LCD-CDR) 206 via the system interface (SS/IF) 207 like the system of FIG. 33.

Figure 14:
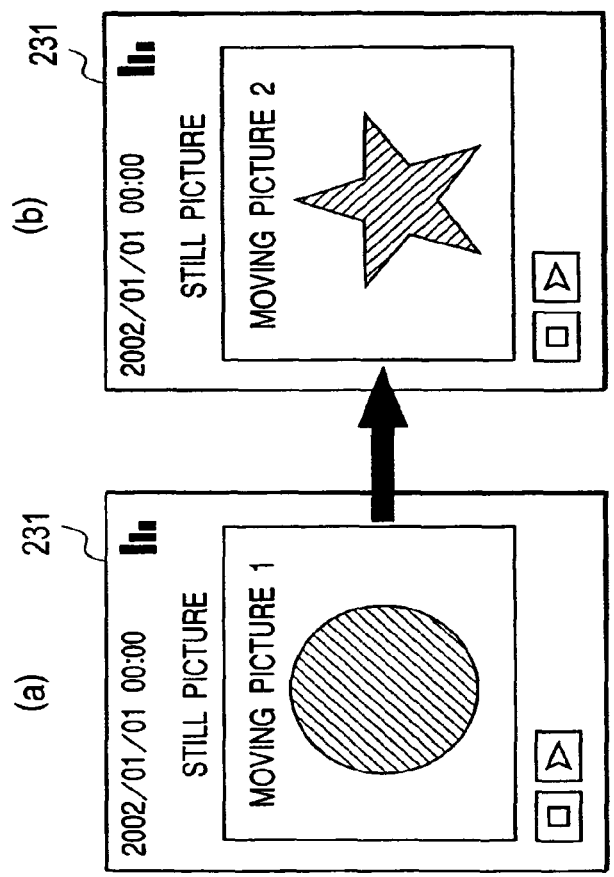
FIG. 14 is a schematic diagram for describing a profile of change of display of a moving picture on the display screen of a mobile telephone utilizing the configuration of an embodiment of the display drive control circuit of the present invention.

FIG. 14 is a schematic diagram for describing a profile of change of display of moving picture on the display screen of a mobile telephone utilizing an embodiment of the display drive control circuit of the present invention. The moving picture interface MP/IF 208 executes display operation with synchronization signals (vertical synchronization signal VSYNC, horizontal synchronization signal HSYNC, dot clock DOTCLK) which are required for display operation and writes the display data into the display memory (built-in RAM: M) 263 of the liquid crystal controller driver (LCD=CDR) 206 with a display data signal (for example, 18-bit: PD17 to PD0, hereinafter referred to as PD17-0) and a data enable signal (ENABLE) which will be described later. Thereby, change of display screen to the display of FIG. 14(b) from the display of FIG. 14(a) is performed from the beginning of the relevant display and changing from the intermediate part of display is never occurs.

Figure 15:
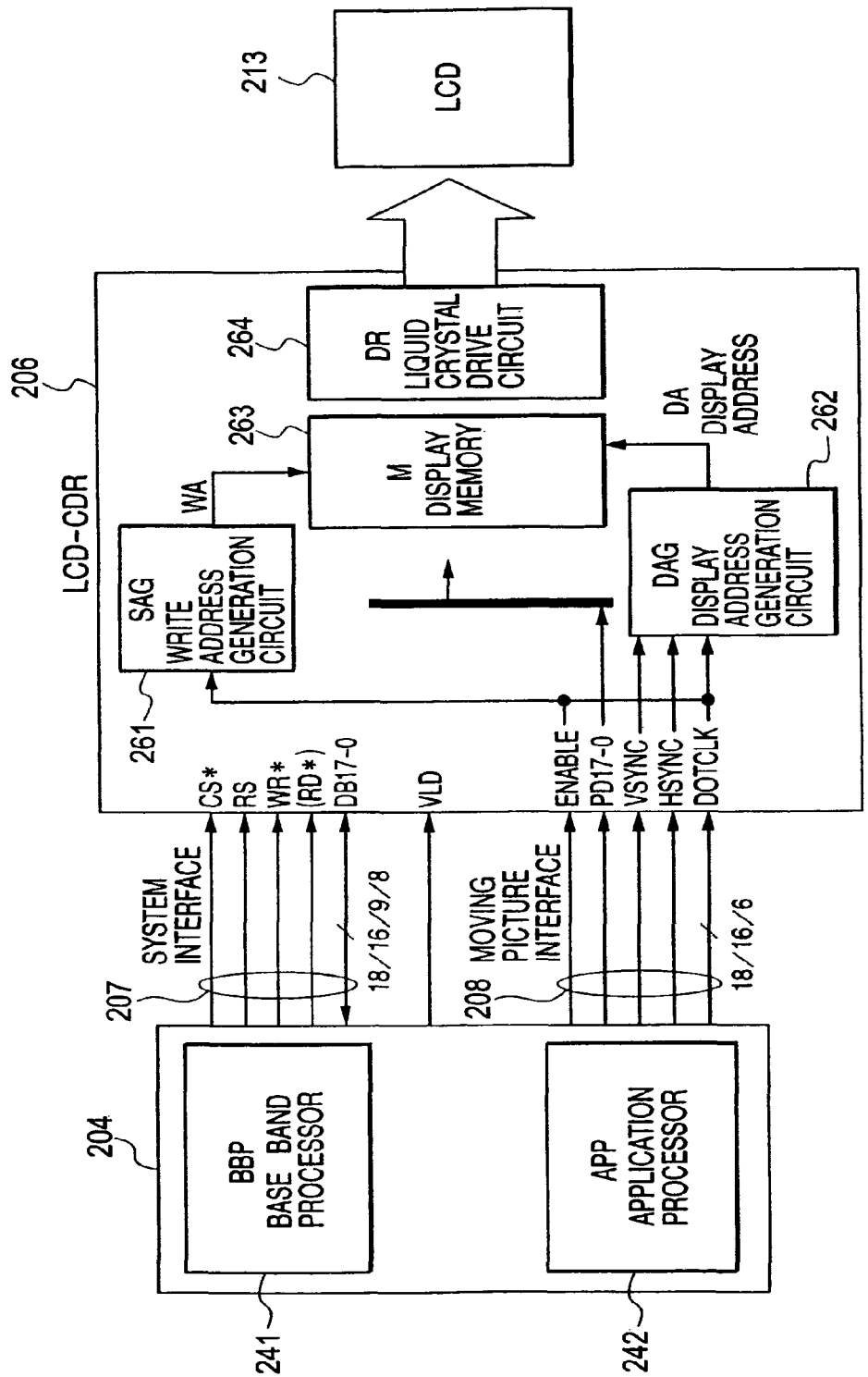
FIG. 15 is a block diagram for describing circuit configuration of a liquid crystal controller driver of the present invention and the related circuits thereof.

FIG. 15 is a block diagram for describing moving picture display operation with the moving picture interface through the circuit configuration of the liquid crystal controller driver and the related circuits thereof of the present invention. In FIG. 15, the like elements having the like functions as those in FIG. 13 are designated with like reference numerals. The liquid controller driver (LCD-CDR) 206 is formed, for example, with the known CMOS manufacturing process on a semiconductor substrate (chip) like a single crystalline silicon with inclusion of a write address generation circuit (SAG) 261, a display address generation circuit (DAG) 262, a display memory (M) 263 and a liquid crystal drive circuit (DR) 264. The display data is written from the data bus (PD17-0). In this case, the write address WA is generated by the write address generation circuit (SAG) 206 based on the dot clock DOTCLK and enable signal ENABLE among the moving picture interface signals (VSYNC, HSYNC, DOTCLK, ENABLE). Namely, the address generation circuit (SAG) 261 includes a counter which counts the dot clock DOTCLK in accordance with active level of the enable signal ENABLE and an output of this counter is defined as the write address WA. This enable signal ENABLE is set to the active level at the beginning of the moving picture display area and is also set to the non-active level at the ending of the moving picture display area. The counter of the write address generation circuit 261 is reset in its count value with the active level of enable signal and starts the count operation of the dot clock DOTCLK. When the moving picture display area is displayed at the center of the display panel as illustrated in FIG. 14, a register for storing the start address and the end address of the area corresponding to the moving picture display area of the display memory is provided in the liquid crystal controller driver 206. In this case, an output of the counter in the write address generation circuit 261 is defined as the write address with addition of the start address.

Display data is read from the built-in memory (M) 263 depending on the display address generated from the display address generation circuit (DAG) 262 based on the moving picture interface signal and is then transferred to the liquid crystal drive circuit (DR) 264. The display address generation circuit 262 is initialized with the active level of the VYNC and HSYN signals and also includes a counter for counting the dot clock DOTCLK. An output of this counter is defined as the display address DA. Namely, both the write address WA and read address DA of display data are generated with reference to the moving picture interface signal.

Figure 16:
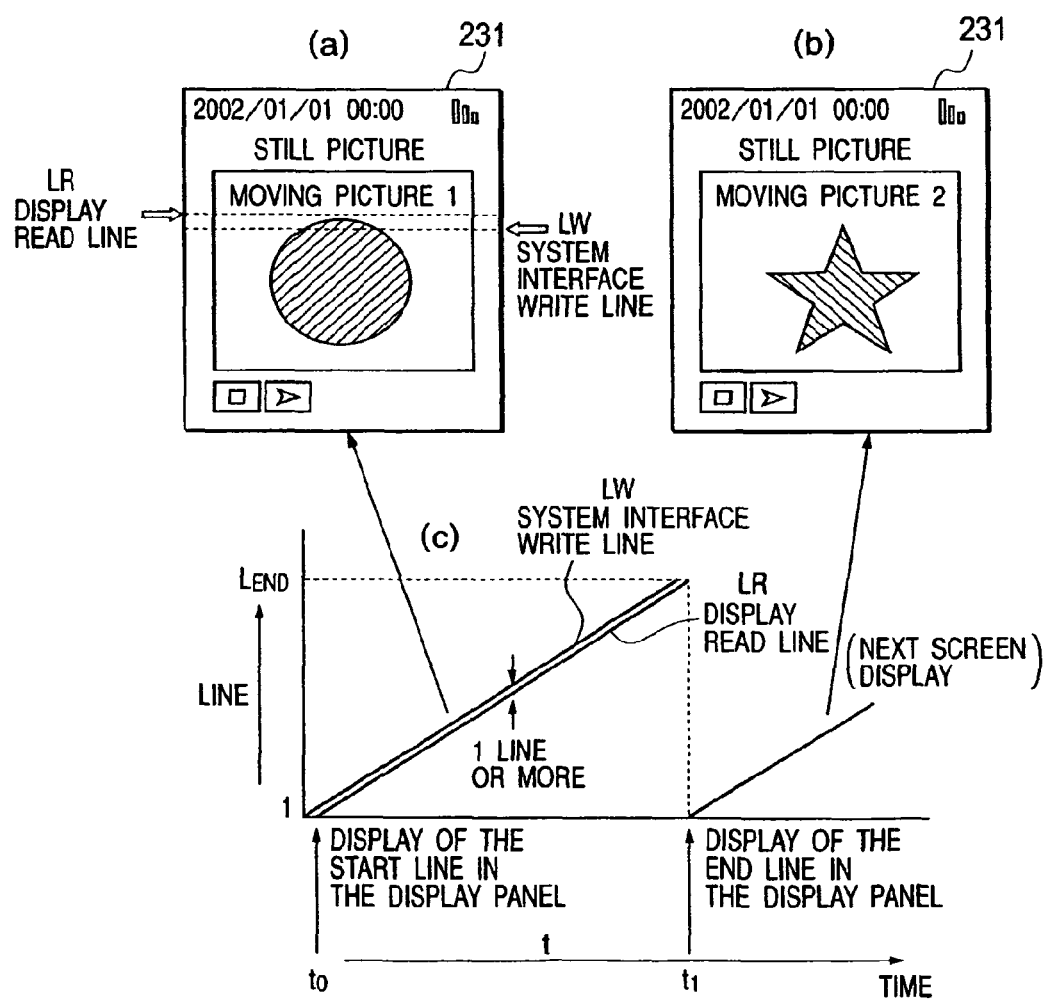
FIG. 16 is a schematic diagram for describing, as display operation in the moving picture interface, a profile of change of display of the moving picture on the display screen of the mobile telephone utilizing a configuration of an embodiment of the display drive control circuit of the present invention.

FIG. 16 is a schematic diagram for describing, as a display operation at the moving picture interface, a profile of change of display of the moving picture on the display screen of the mobile telephone utilizing an embodiment of the display drive control system of the present invention. The display data from the system interface (SS/IF) 207 is written to the display memory (M) 263 depending on the dot clock DOTCLK and enable signal ENABLE from the moving picture interface (MP/IF) 208 of FIG. 15.

The display data is read in accordance with the moving picture interface signals (VYNC, HSYNC, DOTCLK). The write and read operations of picture data are activated with reference to the same signal and therefore executed in the constant rate. LR in FIG. 16(a) is the read line of display data, while $L_w$ is the write line of display data. Moreover, $L_{END}$ of FIG. 16(c) is the end line.

The time $t_0$ means the screen start line display time and the time $t_1$ means the screen end line display start time. Therefore, since the write operation of display data does not go ahead the read operation thereof with each other, there is no boundary between the moving picture 1 and moving picture 2 as described with reference to FIG. 35 and flicker is not generated in the display screen. It is always enough when an interval of one line or more is kept between the write address and read address. In FIG. 16, the write operation to the display memory and read operation therefrom seem to be generated simultaneously in the same time, but actually it is to be understood that the write operation is executed in the former half cycle of one operation cycle, while the read operation is executed in the latter half cycle thereof. However, in the case where the display memory 263 is a two-port memory provided with the write port and read port, this memory can simultaneously execute both write operation and read operation.

Figure 17:
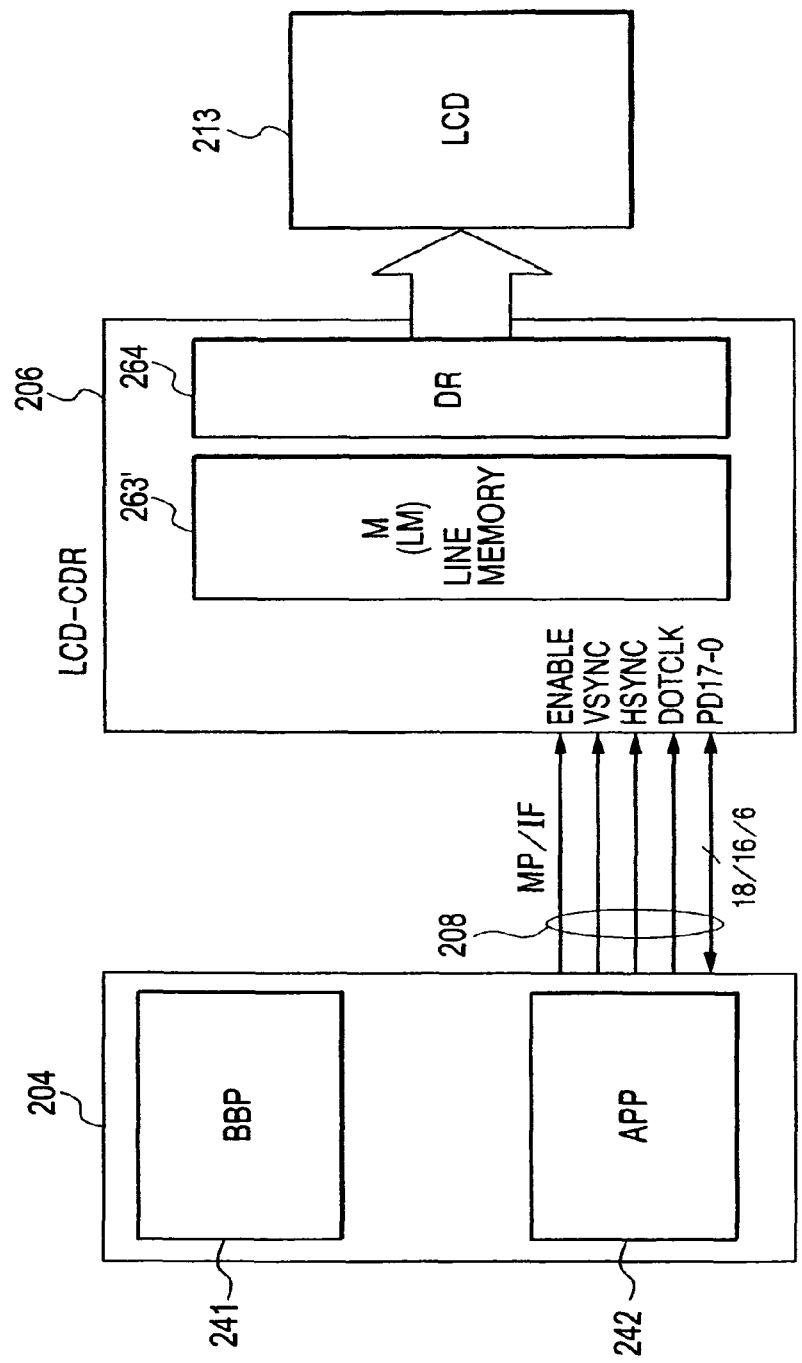
FIG. 17 is a diagram for describing a moving picture interface, a configuration of the liquid crystal controller driver not including a built-in memory and operations thereof for describing effects of the embodiment of the present invention through comparison
Figure 18:
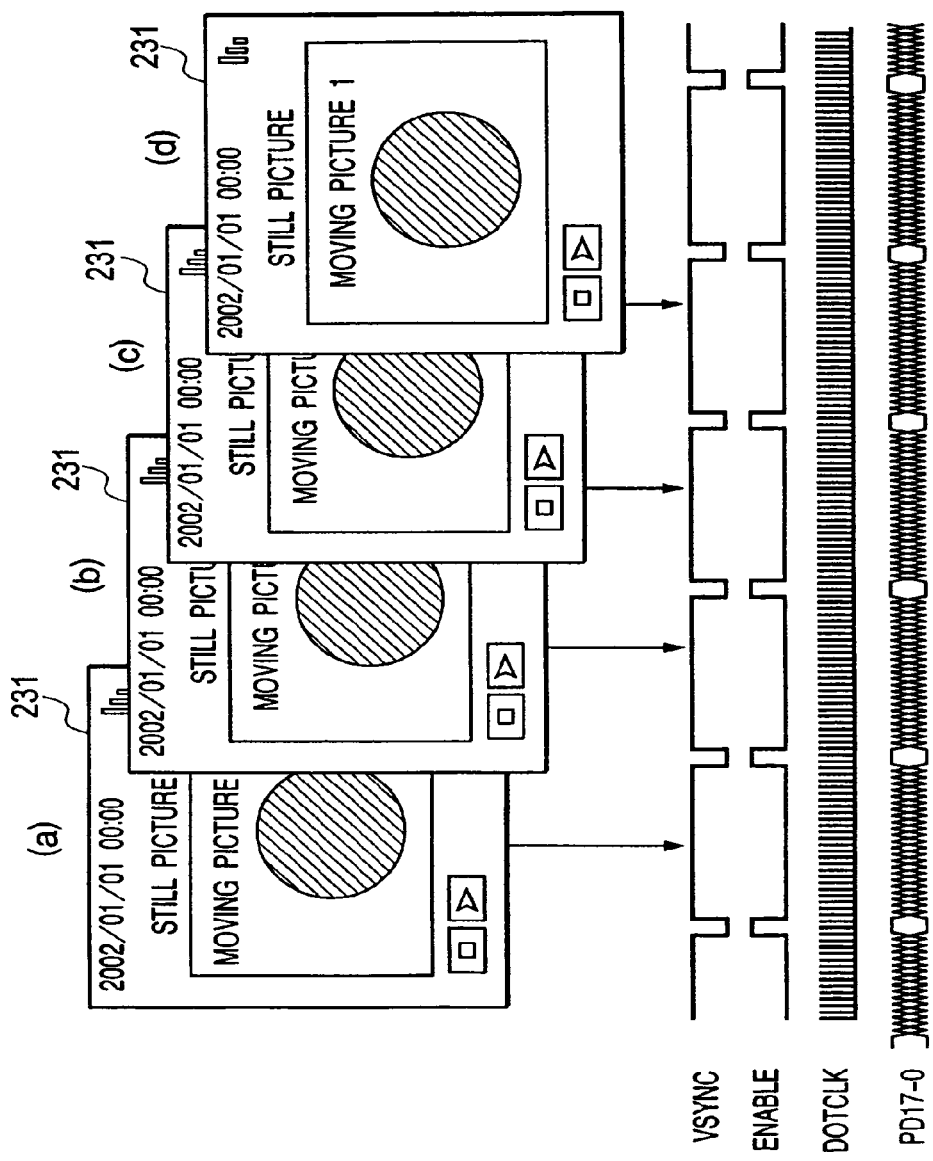
FIG. 18 is a schematic diagram for describing a profile of still picture display by the liquid crystal controller driver of FIG. 17.

Next, the still picture display mode will be explained. FIG. 17 is a diagram for describing the configurations of the moving picture interface and liquid crystal controller driver not including a built-in memory and operations thereof through comparison of effects of the embodiment of the present invention. Moreover, FIG. 18 is a schematic diagram for describing a profile of the still picture display by the liquid controller driver of FIG. 17. This liquid crystal controller driver (LCD-CDR) 206 includes a line memory (LM) 263' as the memory M.

In this configuration, since a RAM memory such as bit map memory is not provided, the same data must always be transferred continuously to the liquid crystal controller driver (LCD-CDR) 206 as illustrated in FIGS. 18(a), 18(b), . . . even in the still picture display mode. Therefore, electrical power is also required for data transfer and reduction of power consumption is very difficult. In addition, since the transfer data is difference for every display screen in the moving picture display, the circuit of the present invention (refer to FIG. 15) which assures the write operation in synchronization with the display operation is very effective.

Figure 19:
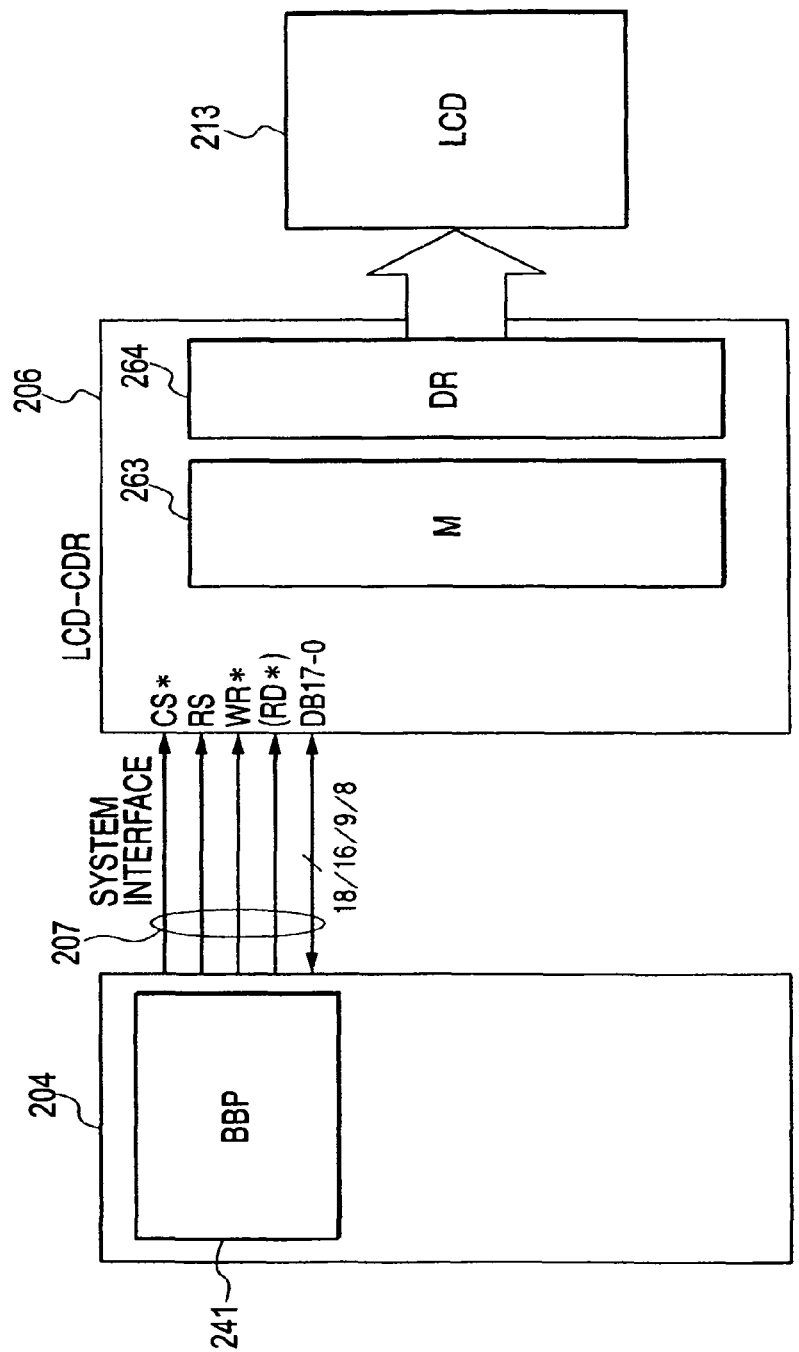
FIG. 19 is a diagram for describing the system interface, a configuration of the liquid controller driver for data transfer with a built-in memory and operation thereof for describing effects of the embodiment of the present invention through comparison.

FIG. 19 is a diagram for describing a configuration and operation of the system interface and liquid crystal controller driver for data transfer by the built-in memory through comparison of effects of the embodiment of the present invention. Moreover, FIG. 20 is a schematic diagram for describing a profile of the still picture display by the liquid crystal controller driver of FIG. 19. In the configuration illustrated in FIG. 19, as the built-in memory (M) 263, a bit map memory (M) 263 which is the RAM memory like that of FIG. 15 is built in as the display memory.

After the picture data of a display screen is once written to this built-in memory (M) 263 after illustrated in FIG. 20, it is no longer required to transfer again the still picture data to read the data in the memory (M) 263 with the built-in clock. Therefore, power consumption caused by the data transfer can be reduced. The embodiment of the present invention utilizes the configuration of FIG. 19 in the still picture display mode on the basis of this concept in order to implement functions of the configuration of FIG. 17 in the moving picture display mode. For the changing between the still picture display mode and moving picture display mode, a register described later is provided and these display modes are changed depending on the conditions of this register.

FIG. 21 is a diagram for describing merit and demerit of the various aspects of the present invention through comparison of the embodiments of FIG. 17 and FIG. 19. In the configuration 1 of FIG. 21 where only the system interface with a display memory (RAM) is provided, amount of transmission of display data can be minimized even in any picture display mode of the still picture display mode and moving picture display mode because the display, memory (RAM) is built in. However, flicker is generated in the display screen as described in regard to FIG. 32 to FIG. 35.

In the configuration 2 of FIG. 21 where only the moving picture interface with a line memory is provided, picture display without any flicker is possible but power consumption increases because data transfer is always required with inclusion of the still picture display and therefore realization of low power consumption is difficult. Meanwhile, according an embodiment of the present invention, namely the configuration 3 of FIG. 21 where the built-in memory and moving picture interface are provided and moreover the still picture display mode and moving picture display mode are changed, change of display of moving picture without any flicker in the display picture is possible and moreover low power consumption can be realized with minimum necessary data transfer.

Next, a practical system configuration and operation thereof to realize the changing of the display modes of the moving picture and still picture in the moving picture interface and system interface by the present invention will be explained.

Figure 22:
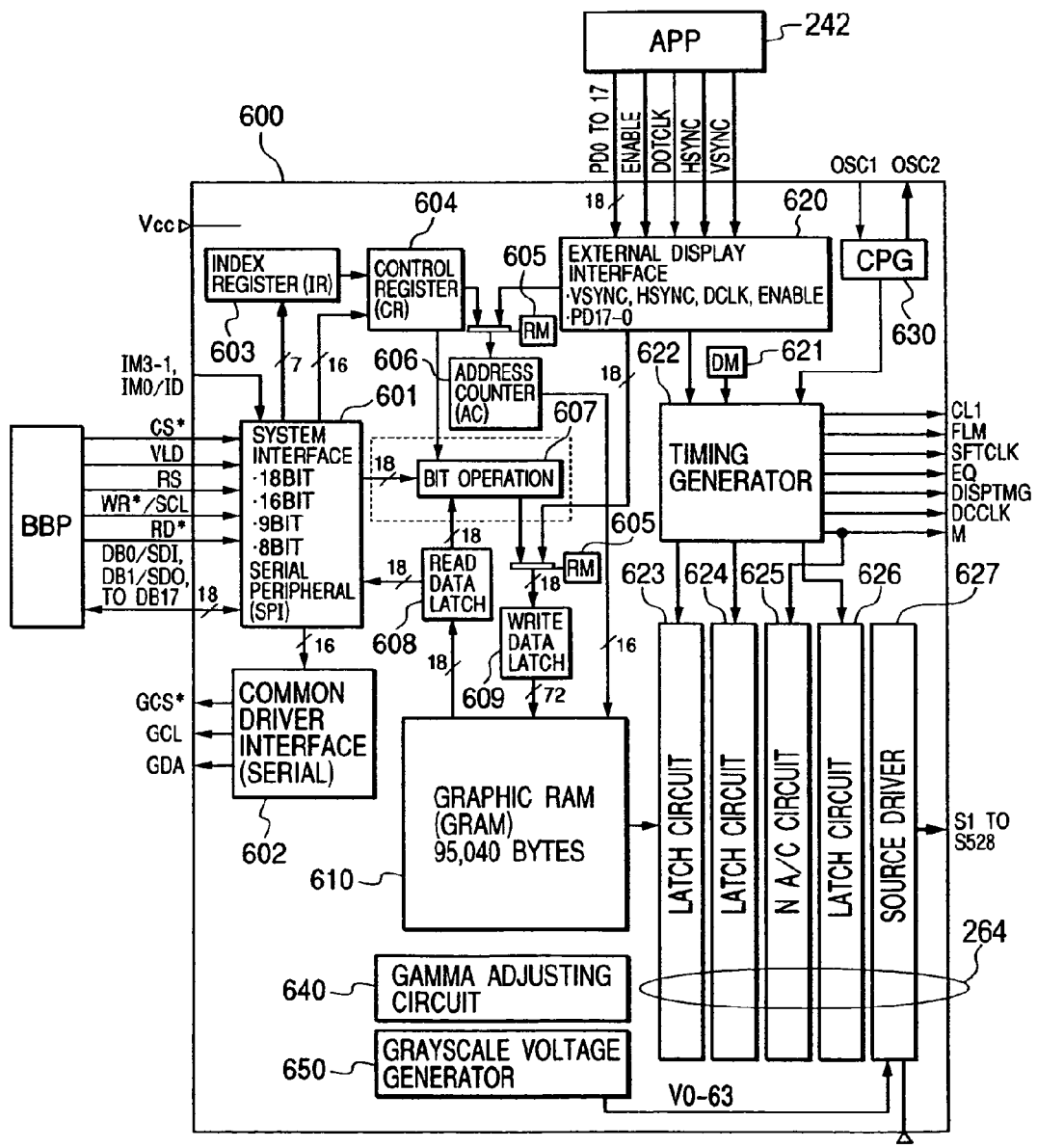
FIG. 22 is a diagram for describing a circuit configuration of a driver chip embodying the liquid crystal controller driver of the present invention.

FIG. 22 is a diagram for describing a circuit configuration of a driver chip embodying a liquid crystal controller driver which forms the display drive control circuit of the present invention. Still picture data and text data or the like to this driver chip 260 are written into a system interface 601 from a baseband processor 241 and these data are written as the display data to a memory of the address designated by an internal address counter (AC) 606, namely to a graphic RAM (GRAM) 610. Display operation is as follows. That is, a timing generation circuit 622 generates a timing and a display address required for the display operation based on the clock signal generated by an internal clock generation circuit (CPG) 630.

With this timing and display address, the display data is read from the graphic RAM (GRAM) 610 and are then transmitted to the liquid crystal panel through conversion into the voltage level which is necessary for liquid crystal display. Changing between the moving picture display mode and still picture display mode is performed by a display operation changing register (DM) 621 or a RAM access changing register (RM) 605.

In the moving picture display mode, moving picture display data (PD17-0), a vertical synchronization signal VSYNC, a horizontal synchronization signal HSYNC, a dot clock DOTCLK and a data enable signal ENABLE are inputted to an external display interface 620 from the application processor 242. The display operation changing register (DM) 621 changes the timing in the timing generation circuit 622 to the synchronization signals (VSYNC, HSYNC) from the built-in reference to generate the necessary timing signal. The timing generation circuit 622 includes the display address generation circuit illustrated in FIG. 15 but this circuit is eliminated to simplify the drawing.

Moreover, the RAM access changing register (RM) 605 changes operation of the write address counter (AC) 606 to a signal generated from the dot clock DOTCLK and data enable signal ENABLE and also changes a data bus to the graphic RAM (GRAM) 610 to the display data (PD17-0). Thereby, the display operation and RAM access operation can be changed to the external display interface module 620 as the moving picture interface from the system interface 601 and internal clock generation circuit (CPG) 630.

In FIG. 22, reference numeral 602 designates a gate driver interface (serial); 603, an index register (IR); 604, a control register (CR); 607, a bit operation circuit to execute arithmetic process in unit of bit; 608 is a read data latch circuit; 609, a write data latch circuit. Moreover, numerals 623, 624 and 626 are latch circuits, numeral 625, N A/C circuit; 627, a source driver forming a liquid crystal drive circuit (a liquid crystal drive circuit) 264. Numeral 640 is a Gamma (γ) adjusting circuit; 650, a grayscale voltage generator forming a circuit to process the display data to the liquid crystal panel. The bit operation circuit 607 is provided to execute arithmetic operation in unit of bit and rearrangement process in unit bit. Therefore this circuit may be eliminated when this function is unnecessary.

Next, details of the changing register for the system interface and application interface will be explained. Table 1 illustrates a mode setting condition of the RAM access changing register (RM) 605 explained with reference to FIG. 22. In this Table 1, this register is referred to as a RAM access mode register.

TABLE 1

| RM | Interface for RAM access |
|---|---|
| 0 | System interface/VSYNC interface |
| 1 | RGB interface |

Moreover, the Table 2 illustrates a mode setting condition of the display operation changing register (DM) 605 explained with reference to FIG. 22. In the Table 2, this register is referred to as display operation mode register.

TABLE 2

| DM1 | DM0 | Interface for display operation |
|-----|-----|-------------------------------|
| 0 | 0 | Internal clock operation |
| 0 | 1 | RGB interface |
| 1 | 0 | VSYNC interface |
| 1 | 1 | Setting inhibited |

The Table 3 illustrates various display operation mode conditions through the combined setting of the RAM access changing register (RM) and the display operation changing register (DM).

TABLE 3

| Display condition | Operation mode | RAM access setting (RM) | Display operation mode (DM1-0) |
|---|---|---|---|
| Still picture display | Only internal clock operation | System interface (RM = 0) | Internal clock operation (DM1-0 = 00) |
| Moving picture display | RGB interface (1) | RGB interface (RM = 1) | RGB interface (DM1-0 = 01) |
| Rewriting of still picture area in the moving picture display | RGB interface (2) | System interface (RM = 0) | RGB interface (DM1-0 = 01) |
| Moving picture display | VSYNC interface | System interface (RM = 0) | VSYNC interface (DM1-0 = 10) |

As illustrated in the Table 1, the RAM access changing register (RM) set the changing of the interface for making access to the built-in display memory (graphic RAM) GRAM. Setting of the RAM access changing register (RM register) will be explained based on the "Setting Condition of RM". When "RM=0", the write operation of display data to the memory GRAM from only the system interface is possible. Moreover, when "RM=1", the write operation of display data to the memory GRAM only from the application interface (moving picture interface, RGB interface of Table 1) is possible.

The display operation changing register (DM register) illustrated in the Table 2 changes the display operation mode with the setting of 2 bits. The setting of this DM register will be explained based on the "Setting Condition of DM". When "DM=00", the display operation by the built-in clock is performed. Moreover, when "DM=01", the display operation is performed by the moving picture interface (RGB interface). Moreover, when "DM=10", the display operation is performed by the VSYNC interface and this display operation is performed only with the VSYNC signal in the RGB interface and with the built-in block. Setting of "DM=11" is inhibited.

As described above, change of interface is independently controlled with two registers of the RAM access change register and display operation change register (RAM register and DM register). As summarized in the Table 3, various operations in various display modes can be realized by changing the display operation in accordance with the setting conditions of a couple of registers. In the Table 3, the "setting conditions of DM" is expressed as (DM1-0=00).

Figure 23:
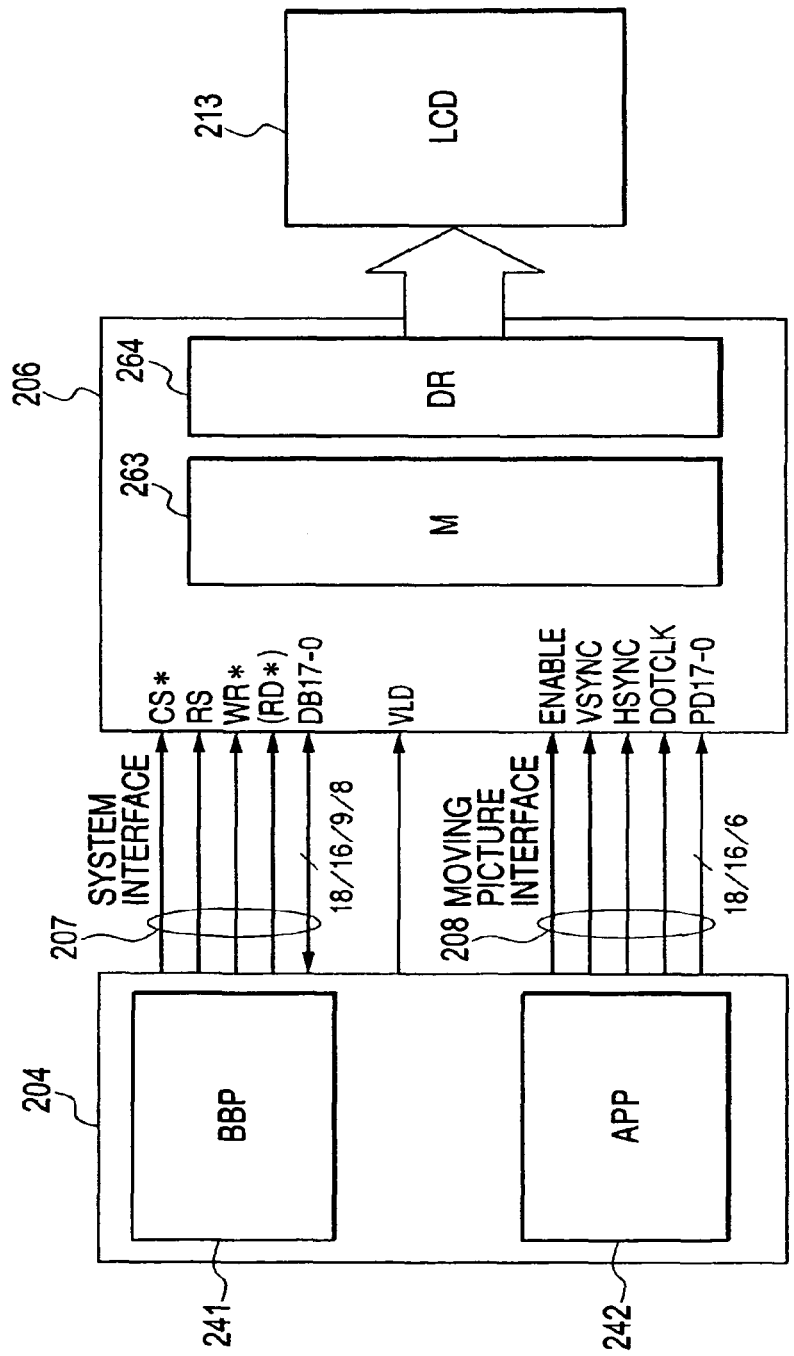
FIG. 23 is a diagram for describing a configuration of an embodiment of a liquid crystal controller driver which is provided with a system interface and an application interface to realize data transfer with a built-in memory and operations thereof.
Figure 24:
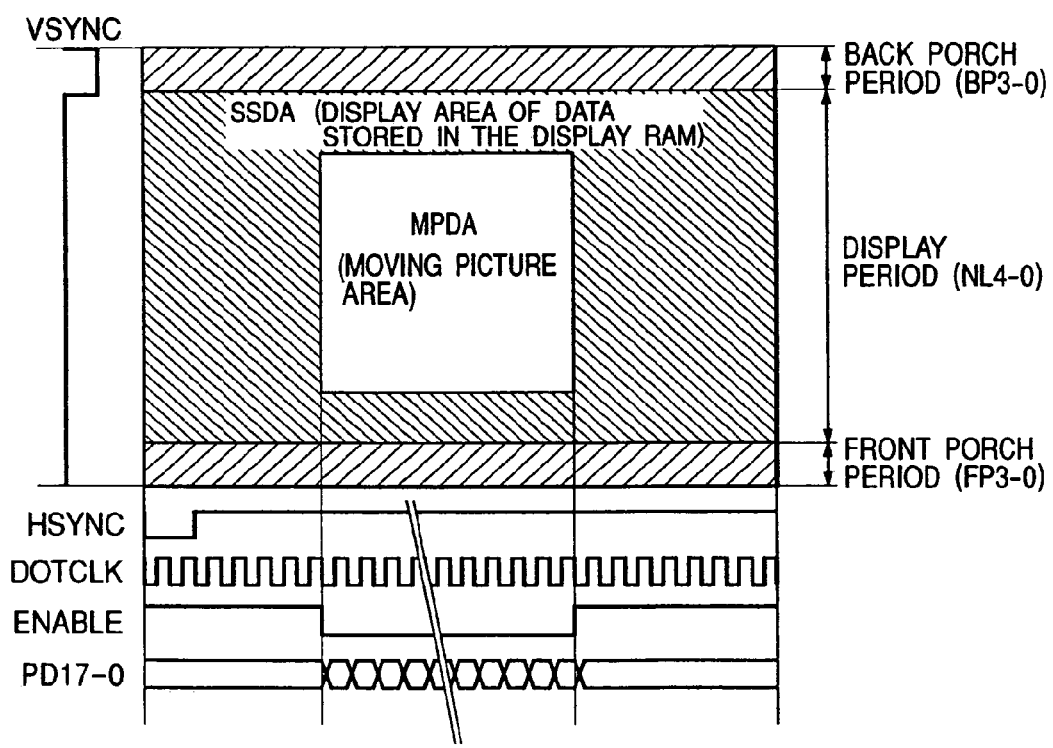
FIG. 24 is a schematic diagram for describing a profile of still picture display by the liquid crystal controller driver of FIG. 23.

FIG. 23 is a diagram for describing a configuration and operation thereof of an embodiment of the liquid crystal controller driver for data transfer with the built-in memory by providing the system interface and application interface. Moreover, FIG. 24 is a schematic diagram for describing a profile of still picture display with the liquid crystal controller driver of FIG. 23. In this embodiment, data of the system interface (baseband interface) 241 for inputting the still picture data or the like and the application interface 242 as the moving picture interface are stored in the built-in RAM memory (display memory M) 263 as the display memory.

The vertical synchronization signal VSYNC becomes a timing signal indicating the start of display screen for display operation, while the horizontal synchronization signal HSYNC becomes the timing signal indicating the line period of the display operation and the dot clock DOTCLK is the clock in unit of pixel and becomes the reference clock of the display operation by the moving picture interface, namely the application interface (APP) 242. Moreover, this dot clock DOTCLK also becomes the write signal of the display memory (M) 263. The application processor 242 transfers the picture data in synchronization with the dot clock DOTCLK. The enable signal ENABLE indicates that each pixel data is effective. Only when this enable signal ENABLE is effective, the transfer data is written into the display memory (M) 263.

Namely, as illustrated in FIG. 24, the moving picture display data PD17-0 is displayed in the moving picture display area MPDA in which the enable signal ENABLE in the RAM data display area (still picture display area) of the display screen is validated. At the upper and lower portions of the display screen, a back porch period (BP3-0) and front porch period (FP3-0) are provided and the display period (NL4-0) is provided between these periods.

Figure 25:
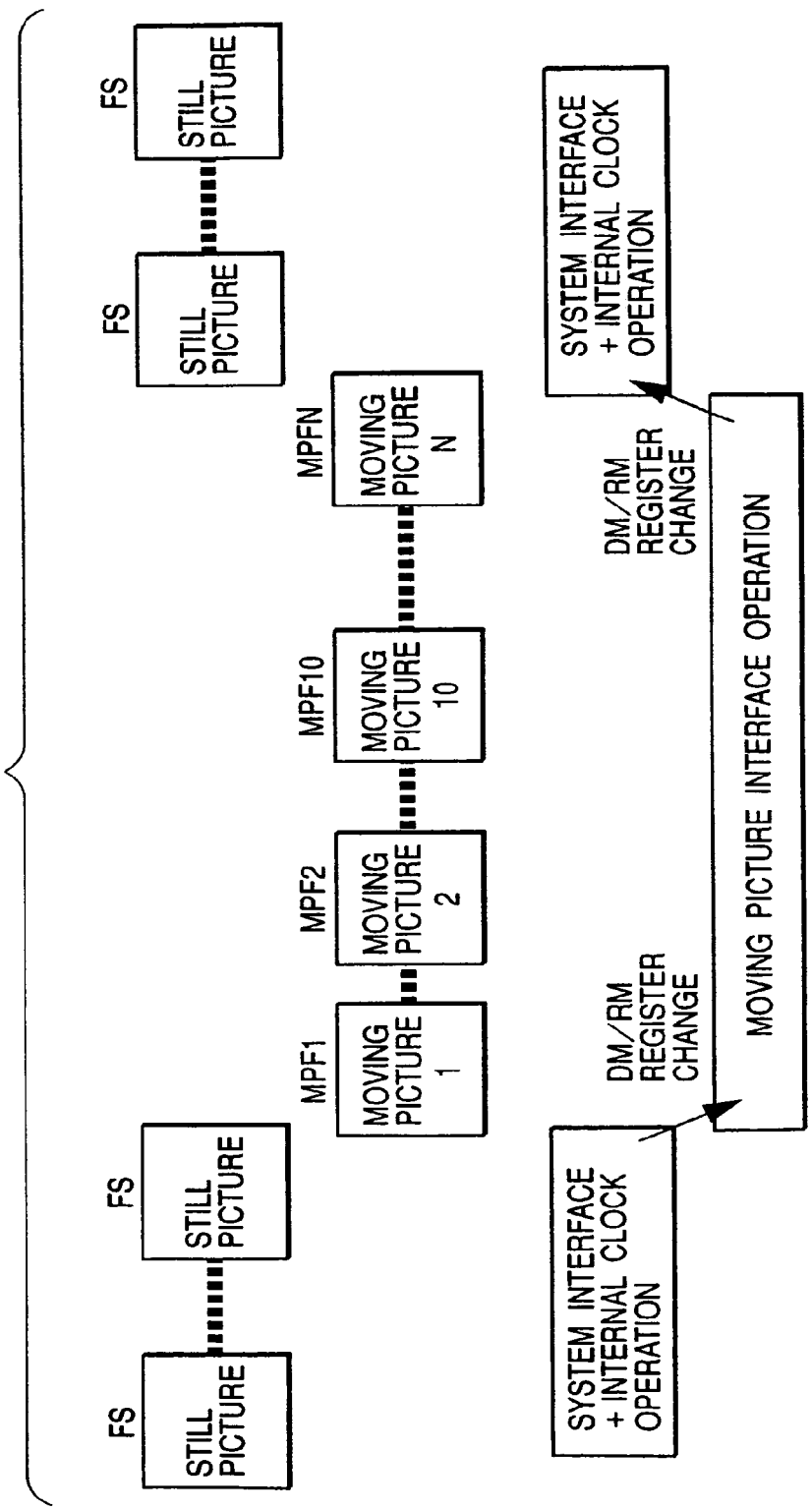
FIG. 25 is a diagram for describing a changing operation for the system interface and application interface in the condition of display picture.

FIG. 25 is a diagram for describing the change operation of the system interface and application interface in the condition of the display screen. A still picture FS is displayed with operation of the system interface, while the moving pictures MP1, MP2, . . . , MP10, . . . , MPN are displayed with operation of the application interface. In the mobile telephone, the period for display of moving picture must be considerably shorter than the total display period. Therefore, low power consumption can be realized with the "system interface+display with internal clock" during the still picture display period which occupies the greater part of display period.

Only for the moving picture display, the application interface (moving picture interface) is set effective by changing each register (RM, DM) as described above. Accordingly, the operation period of the interface which uses the transfer power of data can be minimized to realize reduction in the total power consumption of system. The instruction setting of this system including the setting of register is enabled only from the system interface. However, setting of instruction from the other route is also possible.

Figure 26:
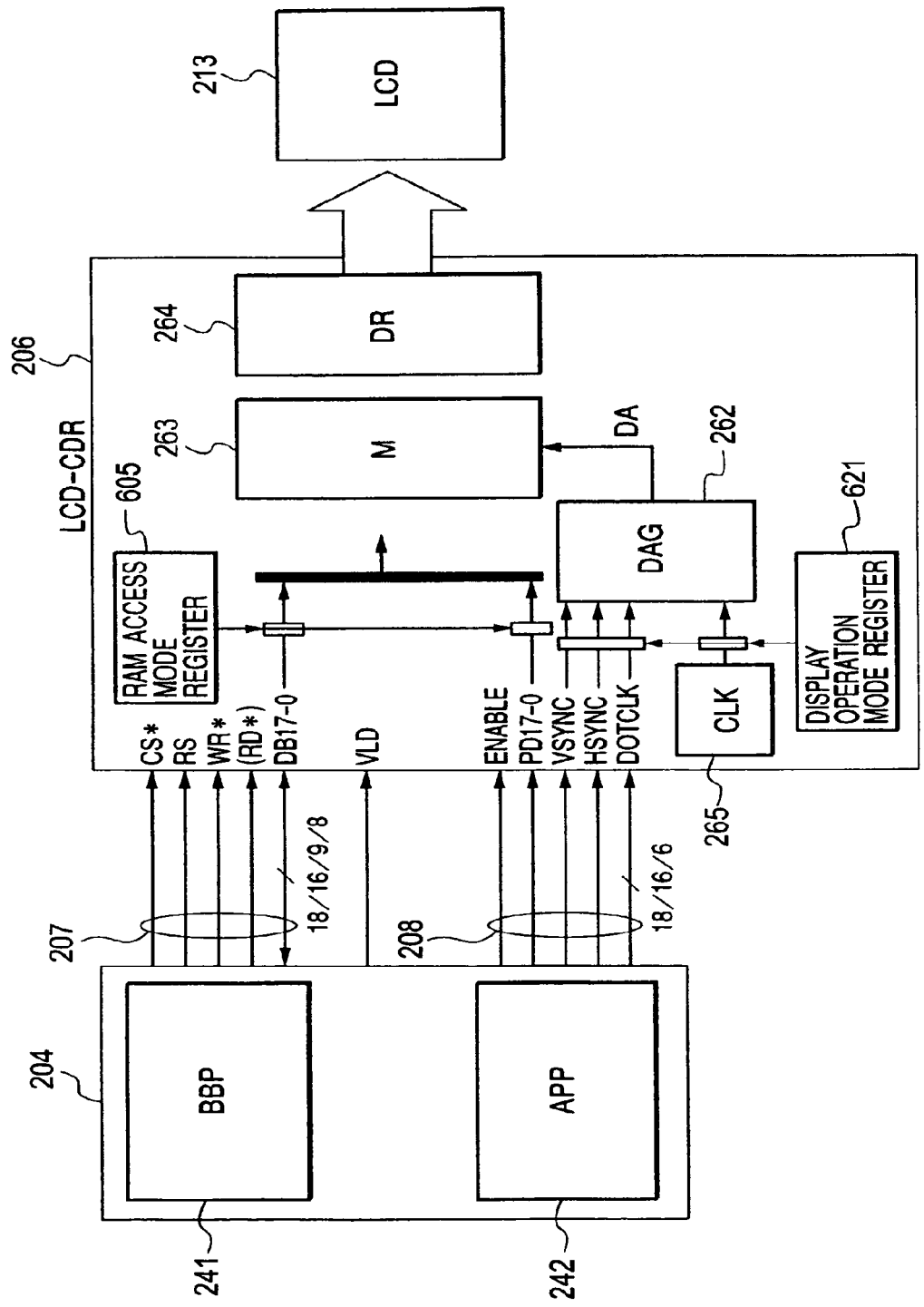
FIG. 26 is a diagram for describing another embodiment of the present invention.

FIG. 26 is a diagram for describing another embodiment of the present invention and is a block diagram for describing a circuit configuration to execute the moving picture buffering operation. In the moving picture display system described with reference to FIG. 17 and FIG. 18, display is performed by sequentially storing the display data in the line memory during the moving picture display (when the application interface is used). Therefore, the display data has to be always transferred continuously. In this embodiment, even when the moving picture interface (application interface (APP) 242) is used, the display data is all stored in the RAM memory (M) 263, the stored display data is read, outputted and then displayed to the liquid crystal panel depending on the synchronization signals (VSYNC, HSYNC, DOTCLK, ENABLE) to be inputted by the moving picture interface (263). Access to the built-in RAM memory (M) 263 is changed with the access mode register (RM register) 605.

Figure 27:
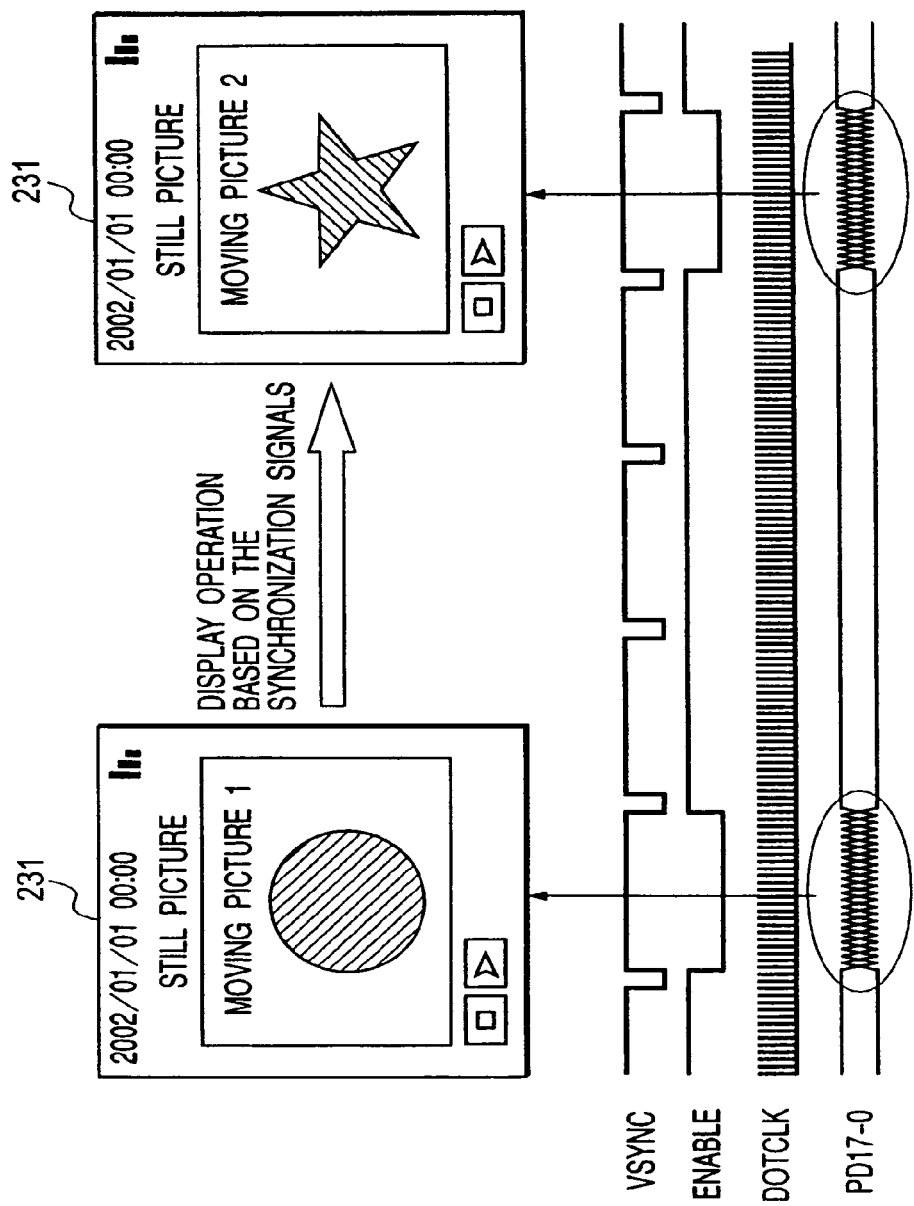
FIG. 27 is a schematic diagram for describing a profile of the transfer of moving picture data in the moving picture buffering operation by a circuit configuration of FIG. 26.

FIG. 27 is a schematic diagram for describing a profile of moving picture data transfer in the moving picture buffering operation by the circuit configuration of FIG. 26.

In the moving picture display in which only the line memory described in FIG. 17 is used, moving picture data must always be transferred. In the present mobile telephone system, the number of frames per second during the moving picture display period is 10 to 15. Therefore, when the number of display frames per second is defined as 60, the change of display screen is performed in every four frames. Namely, the same picture is displayed during the period of four frames.

When a moving picture in the present mobile telephone system has a format described in FIG. 17 and FIG. 18, power consumption by data transfer increases because data transfer must be performed for the same picture data display period of four frames. In this embodiment, since the moving picture buffering is executed for storing all of the moving picture data to the built-in RAM memory, data transfer is performed only during the change of display screen and thereby the display data of the built-in memory can be changed. Thereafter, during the display period of the same display picture, the display data stored in the memory is read and displayed without execution of data transfer from the system side. Accordingly, the number of times of data transfer of moving picture data is reduced ¼ in comparison with the related art under the condition that the number of frames of moving picture per second is 15 and the frame frequency is 60 Hz.

Figure 28:
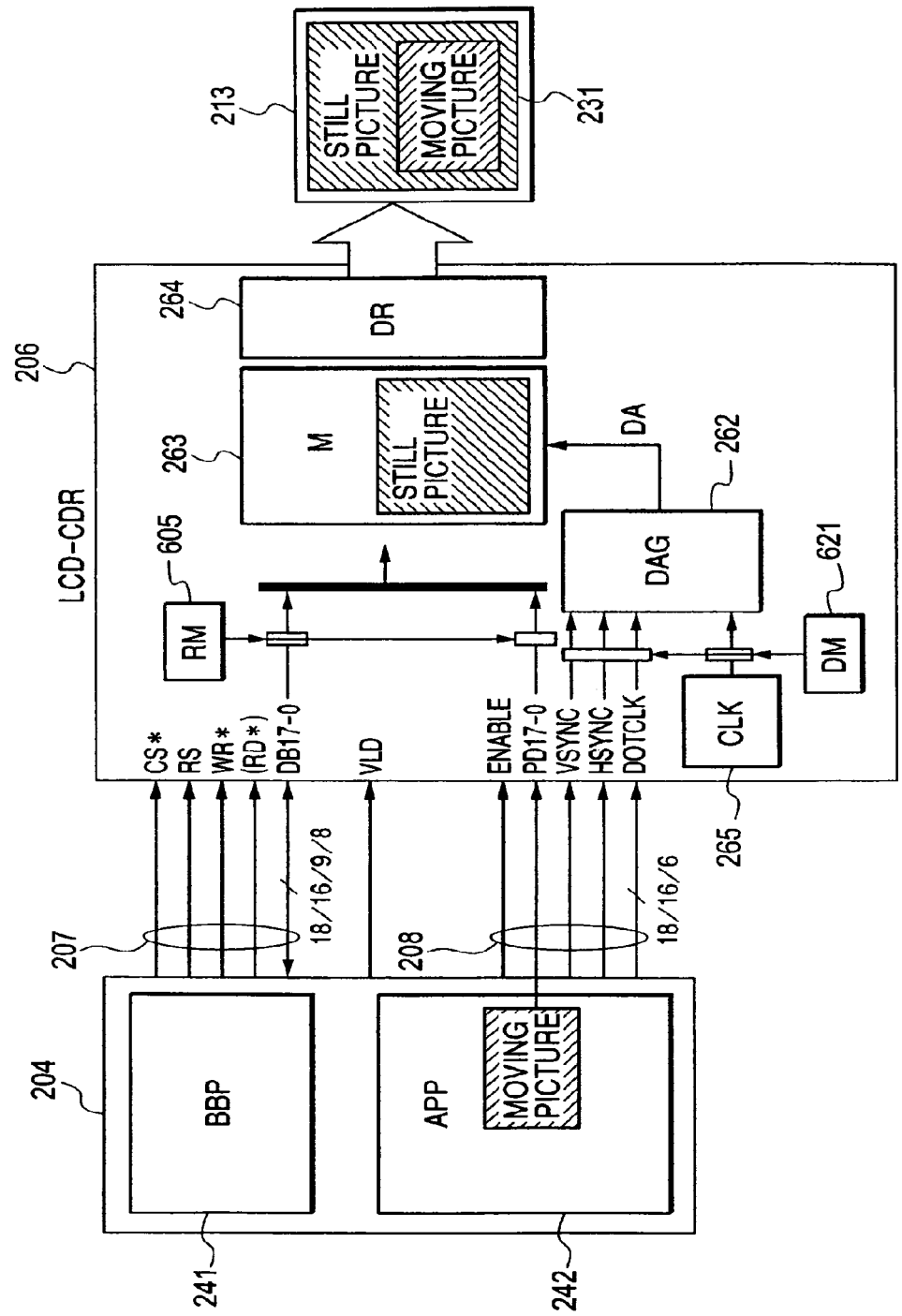
FIG. 28 is a block diagram for describing an embodiment of a circuit configuration to realize the transfer of moving picture in the present invention.
Figure 29:
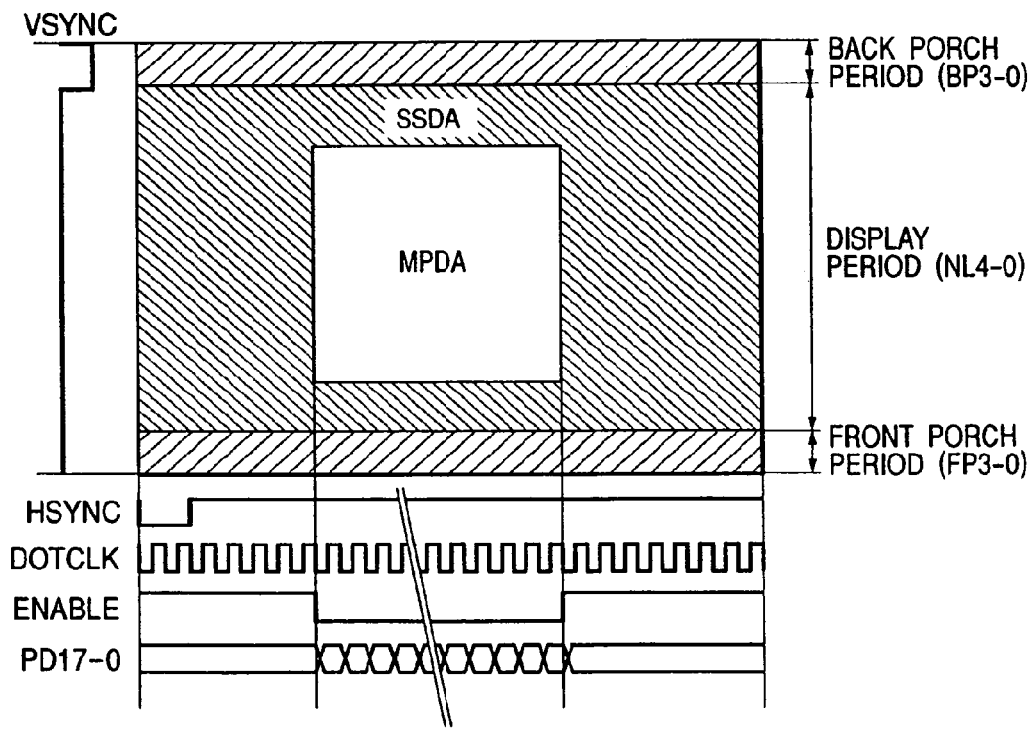
FIG. 29 is a schematic diagram for describing a profile of still picture display only to the selected area by the liquid crystal controller driver of FIG. 28.

In the present invention, it is also possible that the relevant moving picture data is transferred only to the selected area of the moving picture data display area in the case where the moving picture data display area MPDA is inserted to the RAM data display area (still picture display area) SSDA of the display screen described above. FIG. 28 is a block diagram for describing an embodiment of the circuit configuration to realize transfer of moving picture data by the present invention. Moreover, FIG. 29 is a schematic diagram for describing a profile of the still picture display only to the selected area by the liquid crystal controller driver of FIG. 28.

In the case where the moving picture buffering is not performed, the display data must have always been transferred from the moving picture interface including the still picture display area SSDA other than the moving picture display area MPDA during the moving picture display using a part of the liquid crystal panel. Therefore, the number of times of data transfer increases, also resulting in increase of power consumption. In the selected area transfer system of this embodiment, only the display data of the moving picture display area MPDA can be transferred from the moving picture interface.

In the selected area transfer system, still picture data is previously written into the display memory and the display data is written from the moving picture interface only to the display memory designated with the enable signal ENABLE. Accordingly, the still picture and moving picture are combined on the display memory and are then read simultaneously at the time of display operation and are then displayed on the liquid crystal panel 213. According to the present invention, as described above, the moving picture display area can be selectively designated, the moving picture can be displayed with the minimum data transfer corresponding to the moving picture area and thereby power consumption during the data transfer can be reduced. Above process is never limited only to a display device of mobile telephone and can also be applied to a large-size display device such as a personal computer and a display monitor or the like.

Figure 30:
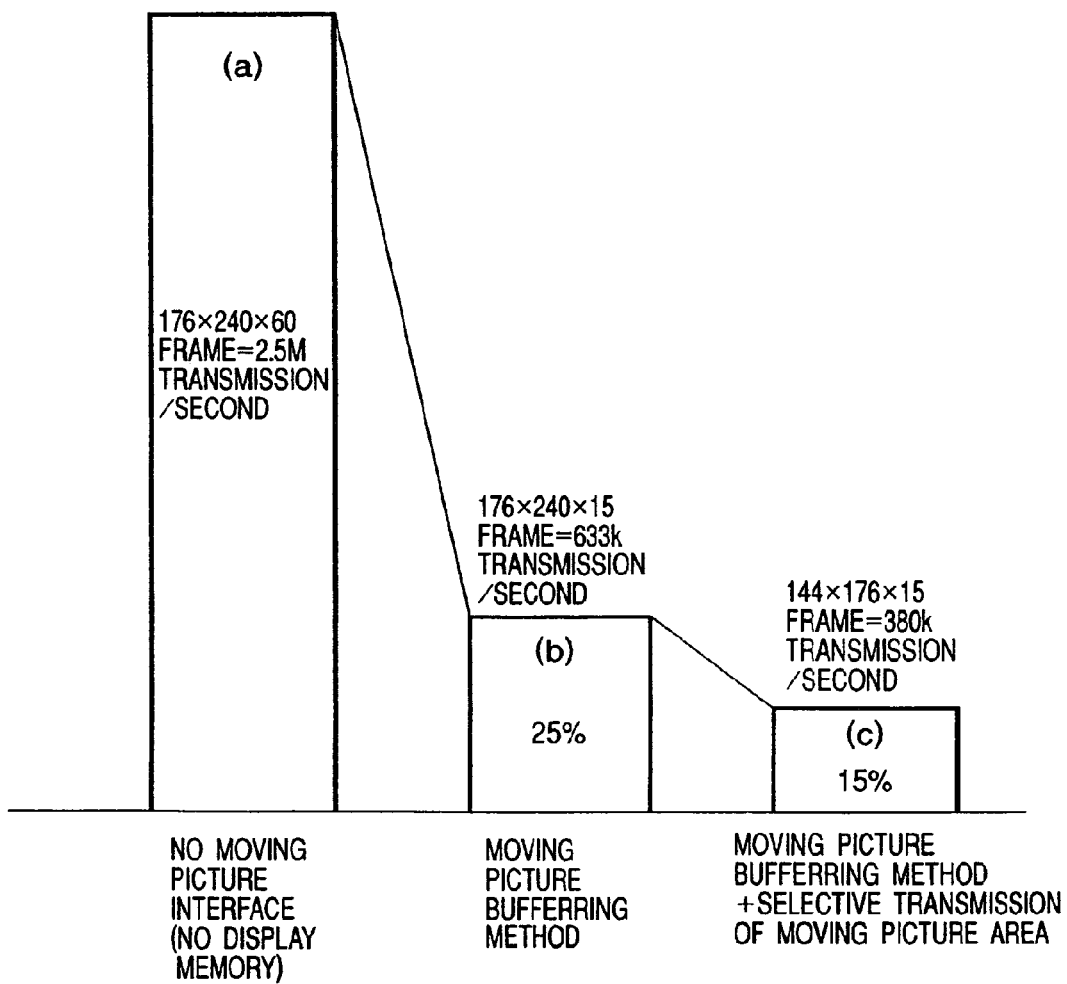
FIG. 30 is a diagram for describing comparison for the number of times of moving picture data transfers in each data transfer system for describing effects of the present invention.

FIG. 30 is a diagram for comparison of the number of times of moving picture data transfer in each data transfer system for describing the effect of the present invention. FIG. 30 illustrates the results of comparison by the liquid crystal display device under the conditions that the liquid crystal panel size is 176×240 dots, moving picture size is QCIF size (144×176 dots), number of moving picture frames is 15/sec (fps) and the frame frequency is 60 Hz. As can be understood from FIG. 30, the results are (a) 176×240×60 frames=2.5 M transfers/sec only for the moving picture interface (without built-in memory), (b) 176×240×15 frames=633 K transfers/sec for the moving picture buffering system and (c) 144×176×15 frames=380 K transfers/sec for the moving picture buffering system+selected moving picture area transfer system.

Therefore, the amount of data transfer in the (b) moving picture buffering system is reduced by about 25% in comparison with the (a) moving picture interface, while the amount of data transfer in the (c) moving picture buffering system+selected moving picture area transfer system is reduced by about 15% in comparison with the (a) moving picture interface.

Figure 31:
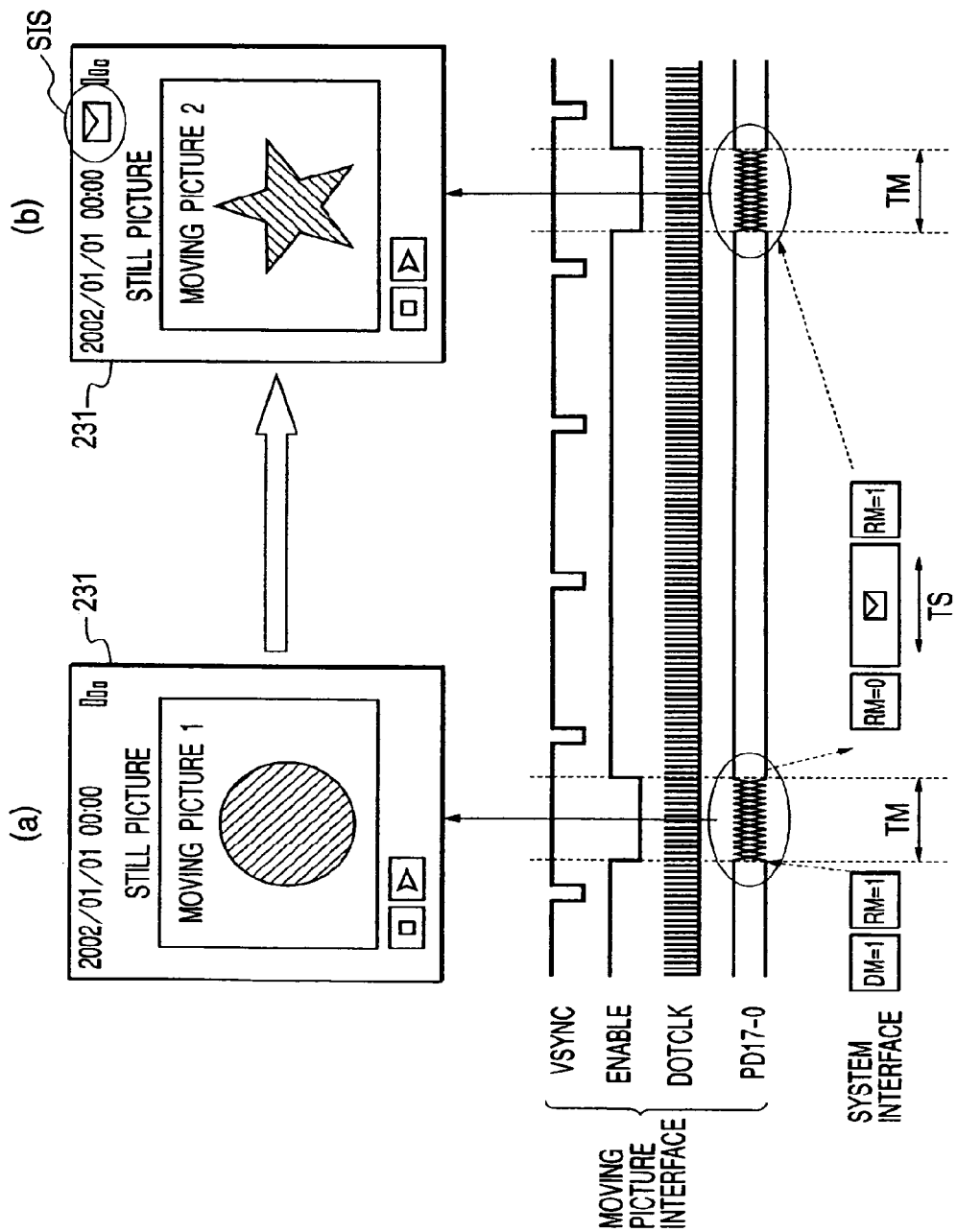
FIG. 31 is a diagram for describing another embodiment of the present invention.

FIG. 31 is a diagram for describing another embodiment of the present invention and is a schematic diagram for describing a system for changing display in the still picture display area during the display of moving picture. As has been described practically with reference to FIG. 22, in the liquid crystal controller driver of the present invention, a register changes the still picture interface and the moving picture interface and the moving picture buffering as described with reference to FIG. 26 is possible. Accordingly, display in the still picture area can also be changed during the display of moving picture.

As illustrated in FIG. 31, even when a moving picture is being displayed on the display screen, it is required to change the icon marks (clock, radio wave condition) used for the mobile telephone. Here, an example is considered where a mail termination display SIS is displayed in the still picture display area on the display screen. Change of display data based on the moving picture buffering system is performed at the time of changing the display picture. During the other periods, only the display operation is performed. As described previously, the still picture display mode and moving picture display mode are changed by a register (display operation change register (DM), RAM access change register (RM)). Moreover, this change is performed independently and respectively from display operation and access to memory.

Therefore, in this embodiment, as illustrated in the operation waveforms of FIG. 31, only the RAM access is changed to the system interface in order to change of display data in the still picture display area by setting the RAM access change register (RM) to "=0" during the period other than the change of display picture during the moving picture display. When the change period TS of this still picture display area is terminated, the relevant RAM access change register (RM) is set to "=1". During the change period TS of this still picture display area, the display operation change register (DM) is set to "=1" and display is lasted from the moving picture interface. Thereby, change of the still picture display area becomes possible even during the moving picture display to realize more flexible display profiles.

Figure 32:
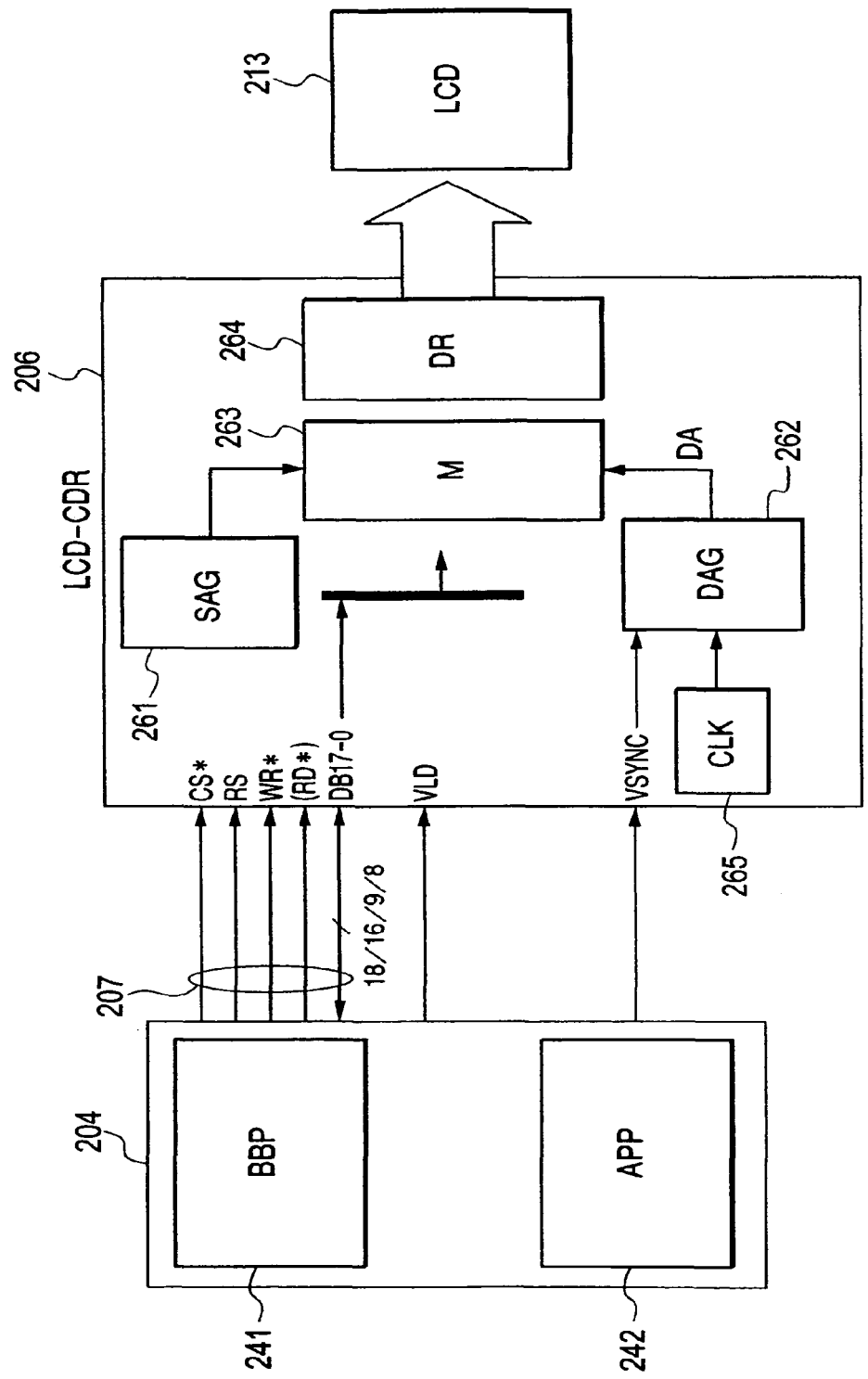
FIG. 32 is a diagram for describing still further embodiments of the present invention.

FIG. 32 is a diagram for describing another embodiment of the present invention and is a block diagram for describing configuration examples of the liquid crystal controller driver and peripheral circuits thereof when the VSYNC interface of the Table 2 and Table 3 is employed. A write address generation circuit (SAG) for controlling the write operation of memory (M) controls, from the system interface, the address generation timing of the display address generation circuit (DAG) for controlling the read operation of the memory (M) with the vertical synchronization signal VSYNC from the application processor 242. In this case, the display address generation circuit (DAG) includes a counter which is reset with the active level of the vertical synchronization signal VSYNC to count up the clock signal generated from the built-in clock circuit CLK and an output of this counter is used as the display address DA. In the case of this configuration, moving picture data can be displayed without almost any modification of the existing system. The write operation speed of moving picture data from the system interface side must be performed sufficiently faster than the display operation based on the clock signal from the built-in clock generation circuit. Other configurations and operations are identical to that described with reference to FIG. 15.

In the configuration of this embodiment, picture display may be synchronized with the scanning timing on the screen by controlling the written display data read start point with the vertical synchronization signal VSYNC from the application processor 242 for the display memory (M) and thereby the display picture is never changed in the course of display screen. Accordingly, no flicker is generated on the display screen during the change of display picture.

As described above, according to the present invention, since the display picture is changed during the moving picture period in synchronization with frames, no flicker is displayed on the display screen during the change of picture displayed. Moreover, since the number of transfer data of display data during the moving picture display can be reduced, a total power consumption of system using the display drive control circuit of the present invention can also be reduced.

In addition, since the system is configured to independently control the change between the still-picture-text-system-I/O-interface and external display interface for inputting the moving picture data from the picture data processor and the access to the picture display memory, the display mode can be selected in accordance with the display contents.

Moreover, respective interface functions can be used effectively by changing the corresponding interface in the moving picture display mode and still picture display mode and the total power consumption of system can also be reduced.

While this invention has been described in conjunction with specific embodiments thereof, many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein.

What is claimed is:

1. A display control driver on a semiconductor substrate, comprising:
a memory configured to store display data to be displayed on a display panel, the memory comprising
a plurality of memory cells arranged in row and column directions;
a plurality of word lines to each of which a number of memory cells in a same row are coupled; and
a plurality of bit lines arranged in a direction crossing the word lines and to which input nodes and output nodes are connected;
a drive circuit configured to provide drive signals to the display panel according to data read from the memory;
a first data holding circuit configured to hold the display data and configured to receive the display data in units of a number of bits and to hold the display data;
a second data holding circuit coupled to the first data holding circuit and configured to receive and hold the display data supplied from the first data holding circuit;
a control register configured to store a value for deciding a writing mode of the second data holding circuit and the memory, the writing mode including a consecutive writing mode and a collective writing mode; and
a transfer circuit coupled between the second data holding circuit and the memory,
wherein the transfer circuit is configured to transfer the display data from the second holding circuit to at least a part of the input nodes of the memory specified by the value stored in the control register based on a writing mode,
wherein, in the consecutive writing mode, the display data is transferred from the first data holding circuit to the second data holding circuit in units of the number of bits consecutively, and the transfer circuit transfers the display data from the second data holding circuit is transferred to the memory in units of the number of bits consecutively, and
wherein, in the collective writing mode, the display data is transferred from the first data holding circuit to the second data holding circuit in units of n times the number of bits collectively, where n is an integer larger than 1, the transfer circuit transfers the display data from the second data holding circuit to memory cells coupled to a same word line of the memory in units of n times the number of bits collectively, and the display data is successively transferred to the first data holding circuit during a same time period in which the display data is transferred from the first data holding circuit to the second data holding circuit collectively.

2. The display control device according to claim 1, further comprising:
a plurality of first external terminals to which the display data in units of a number of bits to be stored in the memory is to be supplied; and
a plurality of second external terminals coupled to outputs of the drive circuit and configured to output the drive signals to the display panel,
wherein the first data holding circuit has a plurality of first latch circuits each of which is configured to hold the display data by storing the display data supplied from the first external terminals, in units of the number of bits; and
wherein the second data holding circuit has a plurality of second latch circuits each of which is coupled to a corresponding one of said first latch circuits and is configured to hold the display data received from the corresponding first latch circuit.

3. The display control device according to claim 2, wherein, in the consecutive writing mode, one of the first latch circuit and the corresponding second latch circuit hold therein first display data in units of the number of bits, and thereafter the first display data is written into the memory before another of the first latch circuits and the corresponding second latch circuit hold therein consecutive second display data in units of the number of bits, and wherein, in the collective writing mode, one of the first latch circuits hold a plurality of first display data in units of the number of bits in sequence, and thereafter said one first latch circuits outputs the plurality of first display data in units of n times the number of bits into corresponding ones of said second latch circuits, and thereafter said corresponding second latch circuits provide the plurality of first display data to the memory to write the plurality of first display data in units of n times the number of bits into the memory, collectively, while a plurality of second display data, that follows the plurality of first display data, in units of the number of bits is written into other ones of the first latch circuits in sequence.

4. The display control device according to claim 1, further comprising:
- a gradation voltage generation circuit which generates gradation voltages; and
- a gradation voltage select circuit which selects a desired gradation voltage suitable for the display data that is read from the memory.

5. The display control device according to claim 1, wherein the memory stores the display data in a bit map system.

6. The display control device according to claim 1,
wherein the first data holding circuit includes a plurality of latch circuits, and
wherein the number of latch circuits is equal to a number of memory cells coupled to one word line of the memory.

7. The display control device according to claim 1,
wherein the number of bits of the display data is 16 bits, and n is 4.

8. The display control device according to claim 1, further comprising:
- a third data holding circuit coupled to the memory and configured to receive and hold the display data read from the memory; and
- a bit operation circuit coupled between the third data holding circuit and the first data holding circuit,
wherein the bit operation circuit is configured to perform logical operations for the display data to be received for the first data holding circuit using the display data supplied by the third data holding circuit, and stores the logical operation result to the first data holding circuit.

9. The display control device according to claim 1, further comprising:
- an address counter which generates addresses for the memory.

10. The display control device according to claim 1, further comprising:
- a clock generating circuit which generates clock pulses; and
- a timing generator which is coupled to the clock generating circuit.

11. The display control device according to claim 1, wherein n is 4.

* * * * *